US012105621B2

(12) United States Patent
Narum et al.

(10) Patent No.: US 12,105,621 B2
(45) Date of Patent: Oct. 1, 2024

(54) LOGICAL TO PHYSICAL (L2P) ADDRESS MAPPING WITH FAST L2P TABLE LOAD TIMES

(71) Applicant: Micron Technology, Inc., Boise, ID (US)

(72) Inventors: Steven R. Narum, Meridian, ID (US); Huapeng Guan, Redwood City, CA (US)

(73) Assignee: Micron Technology, Inc., Boise, ID (US)

( * ) Notice: Subject to any disclaimer, the term of this patent is extended or adjusted under 35 U.S.C. 154(b) by 206 days.

(21) Appl. No.: 17/930,117

(22) Filed: Sep. 7, 2022

(65) Prior Publication Data

US 2024/0070061 A1 Feb. 29, 2024

Related U.S. Application Data

(60) Provisional application No. 63/374,101, filed on Aug. 31, 2022.

(51) Int. Cl.
*G06F 12/02* (2006.01)
*G06F 1/3225* (2019.01)

(52) U.S. Cl.
CPC ........ *G06F 12/0246* (2013.01); *G06F 1/3225* (2013.01); *G06F 12/0292* (2013.01); *G06F 2212/205* (2013.01); *G06F 2212/7201* (2013.01)

(58) Field of Classification Search
CPC ....... G06F 2212/205; G06F 2212/7201; G06F 2212/7207; G06F 2212/84; G06F 2212/1032; G06F 12/0246; G06F 12/0292; G06F 12/1009; G06F 1/3225; G06F 3/0619; G06F 3/0647; G06F 3/065; G06F 11/1471; G06F 11/1446
See application file for complete search history.

(56) References Cited

U.S. PATENT DOCUMENTS

| | | | | |
|---|---|---|---|---|
| 2006/0179212 A1* | 8/2006 | Kim | .................... | G06F 12/0246 711/E12.008 |
| 2012/0297118 A1* | 11/2012 | Gorobets | .............. | G06F 3/0679 711/E12.008 |
| 2015/0039907 A1* | 2/2015 | Bowden | ................ | G06F 16/211 711/125 |
| 2015/0127889 A1* | 5/2015 | Hwang | ............... | G06F 12/0253 711/103 |

(Continued)

*Primary Examiner* — Tracy C Chan
(74) *Attorney, Agent, or Firm* — Harrity & Harrity, LLP

(57) ABSTRACT

A memory device may detect a memory operation that updates a level two volatile (L2V) entry stored in an L2V table. Each L2V entry in the L2V table may indicate a mapping between a respective logical block address (LBA) and a respective user data physical address in non-volatile memory. The memory operation may cause a mapping between an LBA indicated in the L2V entry and a user data physical address indicated in the L2V entry to become invalid. The memory device may store, in a volatile memory log, an indication of an LBA region that includes the LBA. The memory device may detect that an L2 transfer condition, associated with the volatile memory log, is satisfied. The memory device may copy, from volatile memory to non-volatile memory, every L2V entry that indicates an LBA included in the LBA region based on detecting that the L2 transfer condition is satisfied.

25 Claims, 13 Drawing Sheets

(56) References Cited

U.S. PATENT DOCUMENTS

| | | | |
|---|---|---|---|
| 2016/0117099 A1* | 4/2016 | Prins | G06F 3/061 |
| | | | 711/103 |
| 2019/0339904 A1* | 11/2019 | Myran | G06F 3/0688 |
| 2022/0129189 A1* | 4/2022 | Zhou | G06F 12/06 |

* cited by examiner

LOGICAL TO PHYSICAL (L2P) ADDRESS MAPPING WITH FAST L2P TABLE LOAD TIMES

CROSS-REFERENCE TO RELATED APPLICATION

This Patent Applications claims priority to U.S. Provisional Patent Application No. 63/374,101, filed on Aug. 31, 2022, and entitled "LOGICAL TO PHYSICAL (L2P) ADDRESS MAPPING WITH FAST L2P TABLE LOAD TIMES." The disclosure of the prior Application is considered part of and is incorporated by reference into this Patent Application.

TECHNICAL FIELD

The present disclosure generally relates to memory devices, memory device operations, and, for example, to logical to physical (L2P) address mapping with fast L2P table load times.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
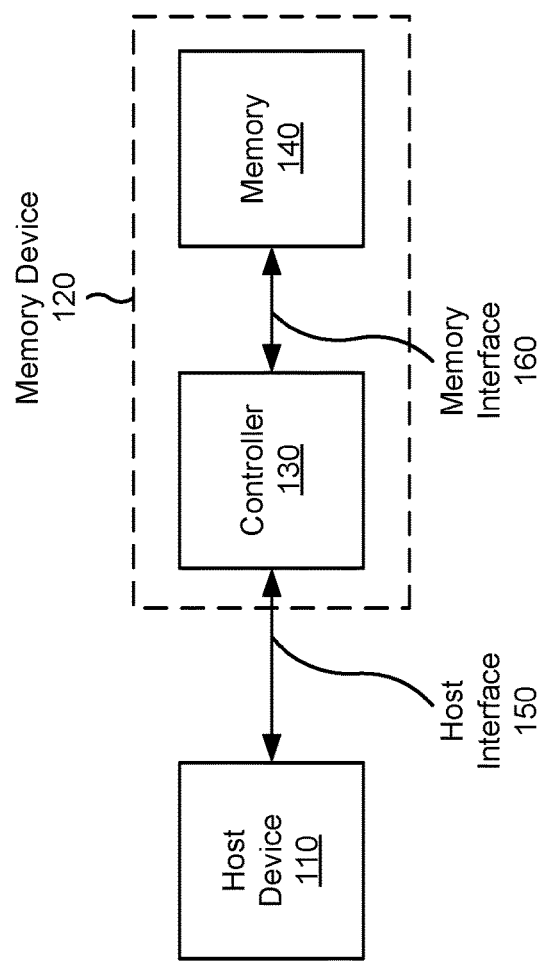
FIG. 1 is a diagram illustrating an example system capable of L2P address mapping with fast L2P table load times.

A memory device may perform logical to physical (L2P) mapping to map a logical address, received from a host device, to a physical address used by the memory device to store user data corresponding to the logical address. The memory device may store one or more L2P tables to assist with performing L2P mapping. In some cases, the memory device may store one or more L2P tables in volatile memory (sometimes called volatile L2P tables) and may use the volatile L2P tables during runtime to achieve lower latency and faster response times to host commands (e.g., as compared to using L2P tables stored in non-volatile memory during runtime). To ensure that L2P mappings are maintained across power cycles (e.g., are maintained when the memory device is powered off), the memory device may also store corresponding L2P tables in non-volatile memory.

Storing updated L2P mappings in non-volatile memory after every memory command (e.g., write command) that results in an updated L2P mapping would lead to high latency and slow response times to host commands as compared to storing those updated L2P mappings in volatile memory. In some cases, current L2P tables (e.g., storing current L2P mappings) may be stored in volatile memory, and the L2P tables stored in non-volatile memory may be updated based on detecting a power down event for the memory device. This may be possible for expected power down events, although it may result in long power down times. For unexpected power down events, such as asynchronous power loss (APL), there may not be sufficient time to transfer all of the current L2P mappings from volatile memory to non-volatile memory prior to power loss, which would result in data loss, data corruption, and/or low reliability. To address this issue, the memory device may trigger the transfer of one or more current L2P mappings from volatile memory to non-volatile memory during runtime of the memory device. This may limit a quantity of L2P mappings in volatile memory that have not yet been transferred to non-volatile memory, and may enable this limited quantity of L2P mappings to be transferred to non-volatile memory during unexpected power down events (e.g., by reducing the time and power consumption needed to perform the transfer).

However, some techniques for transferring current L2P mappings from volatile memory to non-volatile memory during runtime result in large memory overhead and a large die footprint required to perform L2P mapping. Furthermore, some techniques for transferring current L2P mappings from volatile memory to non-volatile memory result in a large amount of time required to load L2P tables to volatile memory upon power up of the memory device, thereby leading to a long time-to-ready (TTR) time for the memory device. Some implementations described herein relate to techniques for transferring L2P mappings to non-volatile memory that reduce memory overhead for L2P mapping, reduce a die footprint required for L2P mapping, and reduce a TTR time and a time to load L2P tables to volatile memory upon power up of the memory device.

FIG. 1 is a diagram illustrating an example system 100 capable of logical to physical address mapping with fast L2P table load times. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMNIC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to store, in volatile memory, a level one volatile (L1V) table that includes multiple L1V entries; store, in the volatile memory, a level two volatile (L2V) table that includes multiple L2V entries, wherein each L2V entry, of the multiple L2V entries, indicates a correspondence between a logical block address (LBA) and a user data physical address in non-volatile memory, wherein each L1V entry, of the multiple L1V entries, indicates a correspondence between an LBA region, associated with a set of LBAs, and a level two non-volatile (L2N) physical address at which a set of L2N entries, corresponding to the set of LBAs, is stored; detect a memory operation that updates an L2V entry of the multiple L2V entries; store, in a changelog, an indication of an updated LBA region associated with the updated L2V entry based on detecting the memory operation that updates the L2V entry; detect that an L2 transfer condition is satisfied; and copy one or more sets of L2V entries, corresponding to one or more updated LBA regions indicated in the changelog, to the non-volatile memory based on detecting that the L2 transfer condition is satisfied.

Additionally, or alternatively, the memory device 120 and/or the controller 130 may be configured to detect a memory operation that updates an L2V entry stored in an L2V table that includes multiple L2V entries, wherein each L2V entry, of the multiple L2V entries, indicates a mapping between a respective LBA and a respective user data physical address in non-volatile memory of the memory device, wherein the memory operation causes a mapping between an LBA indicated in the L2V entry and a user data physical address indicated in the L2V entry to become invalid, and wherein the L2V table is stored in volatile memory of the memory device; store, in a volatile memory log, an indication of an LBA region that includes the LBA based on detecting the memory operation that updates the L2V entry; detect that an L2 transfer condition, associated with the volatile memory log, is satisfied; and copy, from the volatile memory to the non-volatile memory, every L2V entry that indicates an LBA included in the LBA region based on detecting that the L2 transfer condition is satisfied.

As indicated above, FIG. 1 is provided as an example. Other examples may differ from what is described with regard to FIG. 1.

Figure 2:
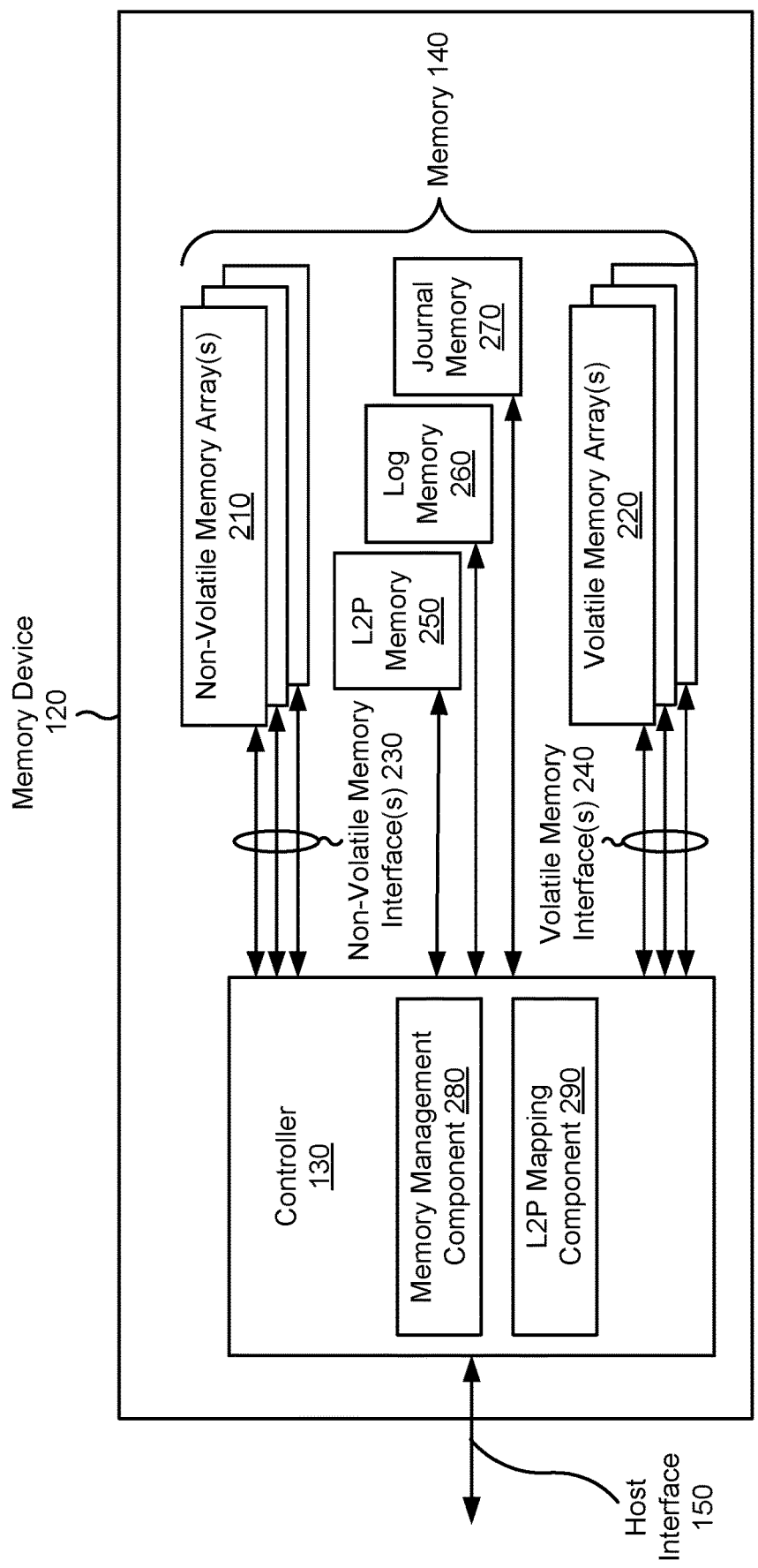
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

In some implementations, the memory 140 may include L2P memory 250, log memory 260, and/or journal memory 270. The L2P memory 250 may include non-volatile L2P memory stored in one or more non-volatile memory arrays 210 and volatile L2P memory stored in one or more volatile memory arrays 220. Similarly, the journal memory 270 may include non-volatile journal memory stored in one or more non-volatile memory arrays 210 (e.g., in one or more non-volatile journal pages) and volatile journal memory stored in one or more volatile memory arrays 220. In some implementations, the log memory 260 includes volatile log memory stored in one or more volatile memory arrays 220.

The L2P memory 250 may be configured to store one or more L2P tables, such as a level zero volatile (L0V) table, a level zero non-volatile (L0N) table, a level one volatile (L1V) table, a level one non-volatile (L1N) table, a level two volatile (L2V) table, and/or a level two non-volatile (L2N) table, described in more detail elsewhere herein. For example, the L2P memory 250 may be configured to store an L0V table, an L1V table, and/or an L2V table in volatile L2P memory, and may store an L0N table, an L1N table, and/or an L2N table in non-volatile L2P memory.

The log memory 260 may be configured to store an indication of LBA regions that are associated with updated L2V entries, in the L2V table, that have not yet been copied to non-volatile memory, as described in more detail elsewhere herein. The journal memory 270 may be configured to store journal entries corresponding to updated L1V entries of the L1V table, as described in more detail elsewhere herein.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 280 and/or a logical to physical (L2P) mapping component 290. In some implementations, one or more of these components are implemented as one or more instructions (e.g., firmware) executed by the controller 130. Alternatively, one or more of these components may be implemented as dedicated integrated circuits distinct from the controller 130.

The memory management component 280 may be configured to manage performance of the memory device 120. For example, the memory management component 280 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 280, such as information regarding memory block age, memory block erase count, and/or error information associated with a memory partition (e.g., a memory cell, a row of memory, a block of memory, or the like).

The L2P mapping component 290 may be configured to manage L2P mapping for the memory device 120. A command received from the host device 110 may indicate an LBA (sometimes called a logical address, a host address, a logical host address) associated with the command. For example, a read command may indicate an LBA from which data is to be read, or a write command may indicate an LBA to which data is to be written (or to overwrite data previously written to that LBA). The L2P mapping component 290 may translate that LBA (or multiple LBAs) to a physical address associated with the memory device 120. The physical address may indicate, for example, a die, a plane, a block, a page, or a portion of the page where the data is located. The L2P mapping component 290 may maintain one or more L2P tables (e.g., L0 tables, L1 tables, and/or L2 tables) in the L2P memory 250, may maintain a log in the log memory 260, and/or may maintain a journal in the journal memory 270. For example, the L2P mapping component 290 may add, remove, copy, or update entries or information stored in the L2P tables, the log, and/or the journal (e.g., based on a memory command, a power up event, and/or a power down event). Additionally, or alternatively, the L2P mapping component 290 may detect conditions that trigger adding, removing, copying, and/or updating the entries or information.

Figure 9:
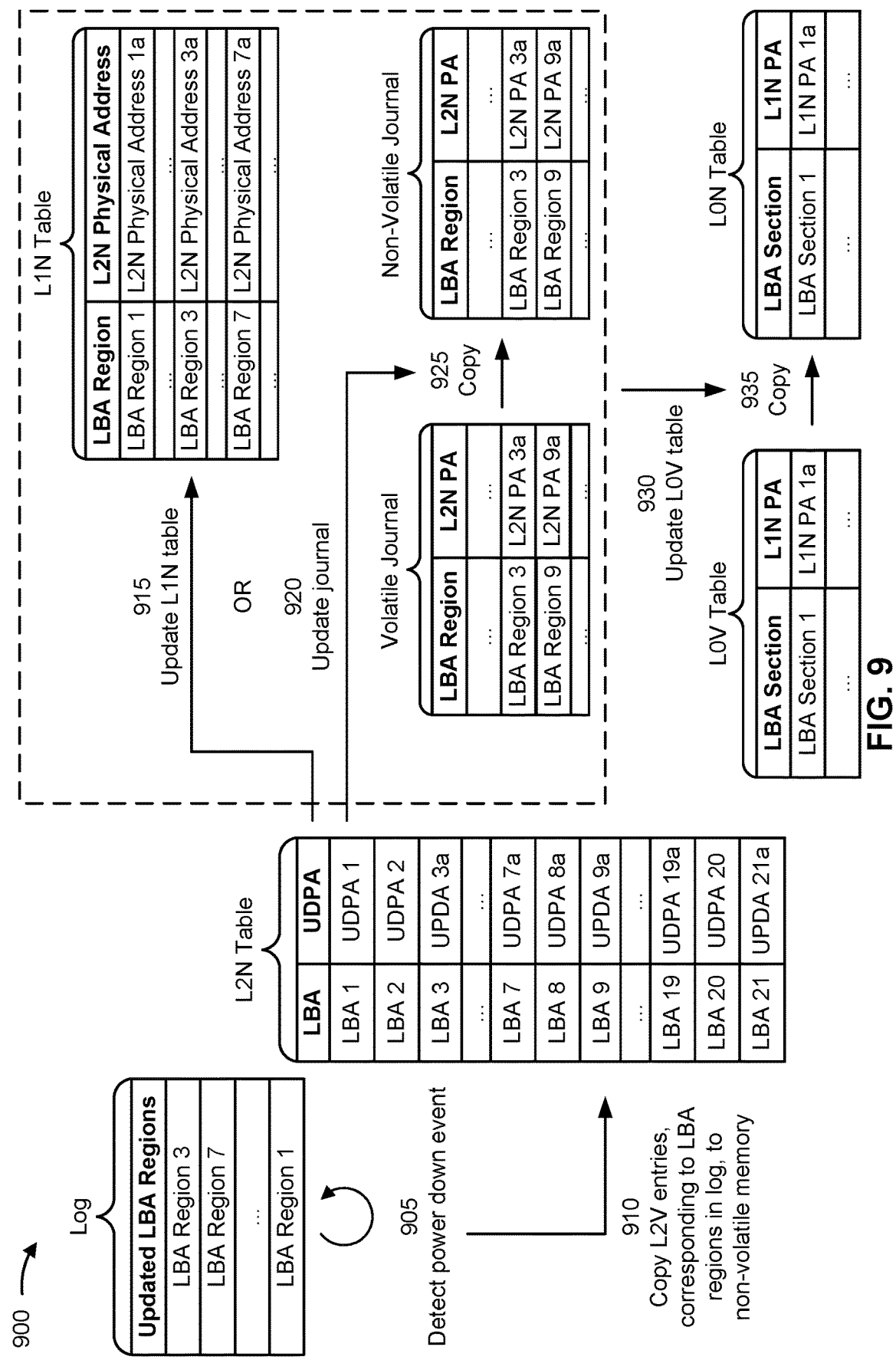
Figure 10:
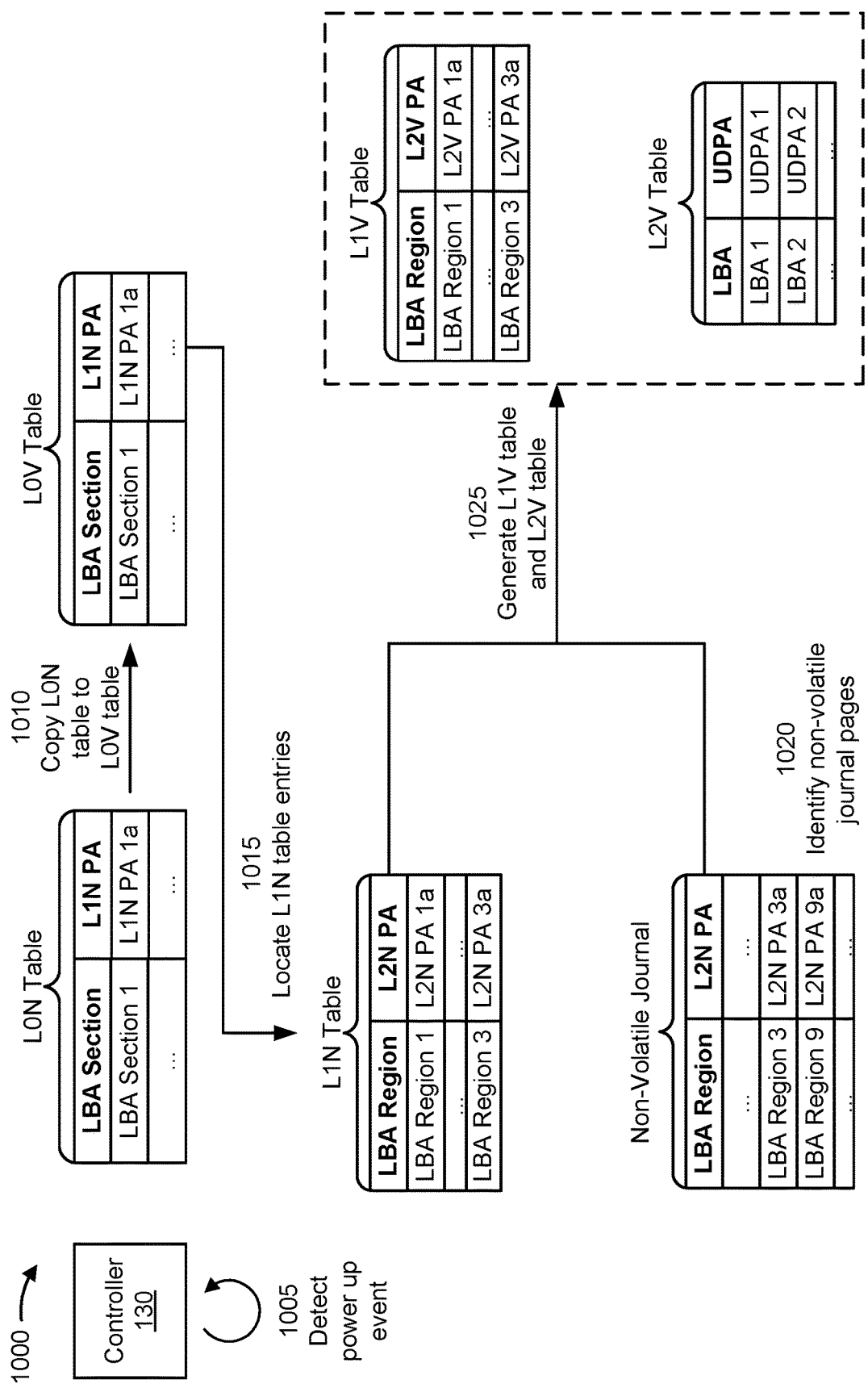
Figure 11:
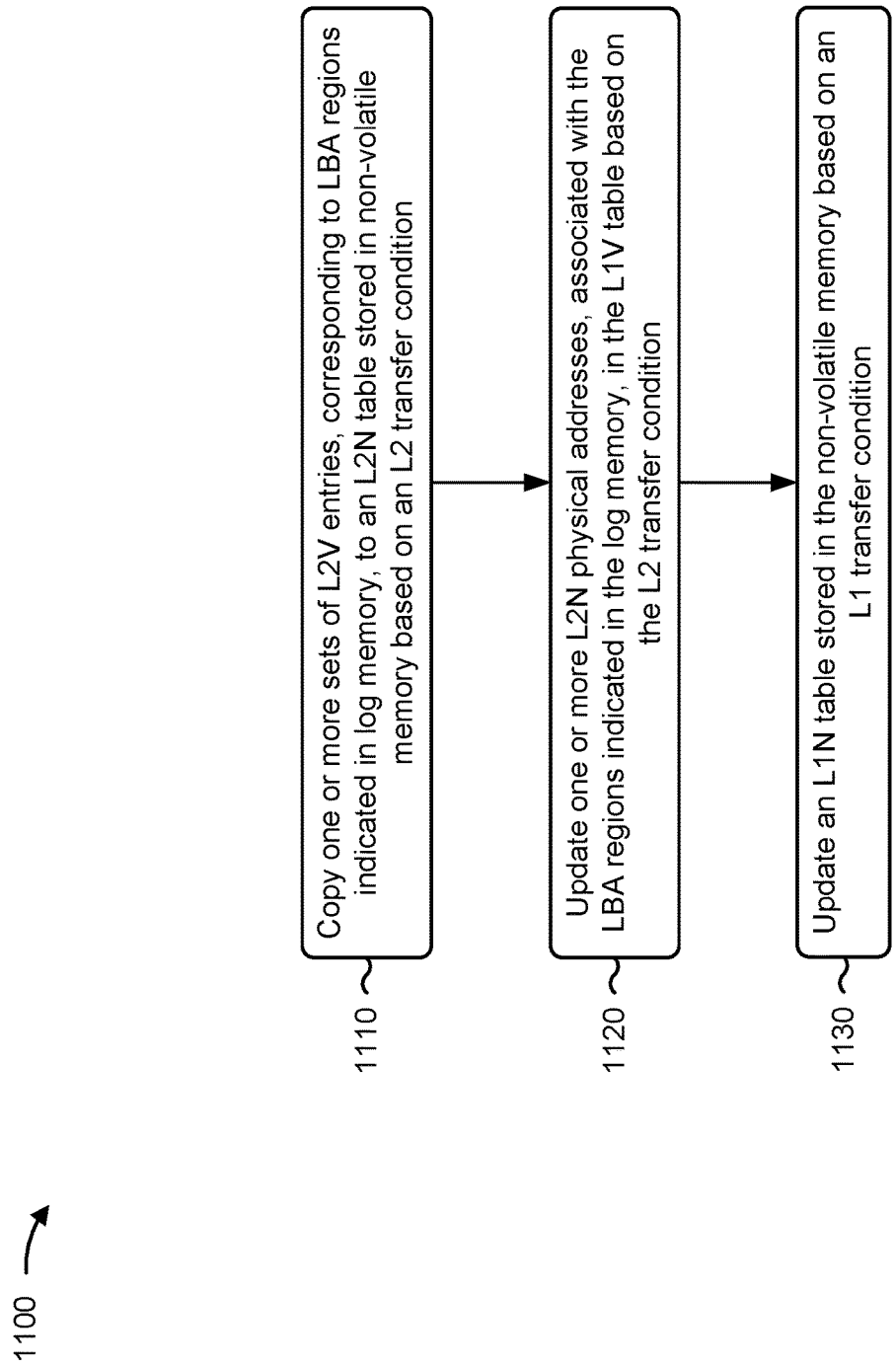
FIG. 11-13 are flowcharts of example methods associated with L2P address mapping with fast L2P table load times.
Figure 12:
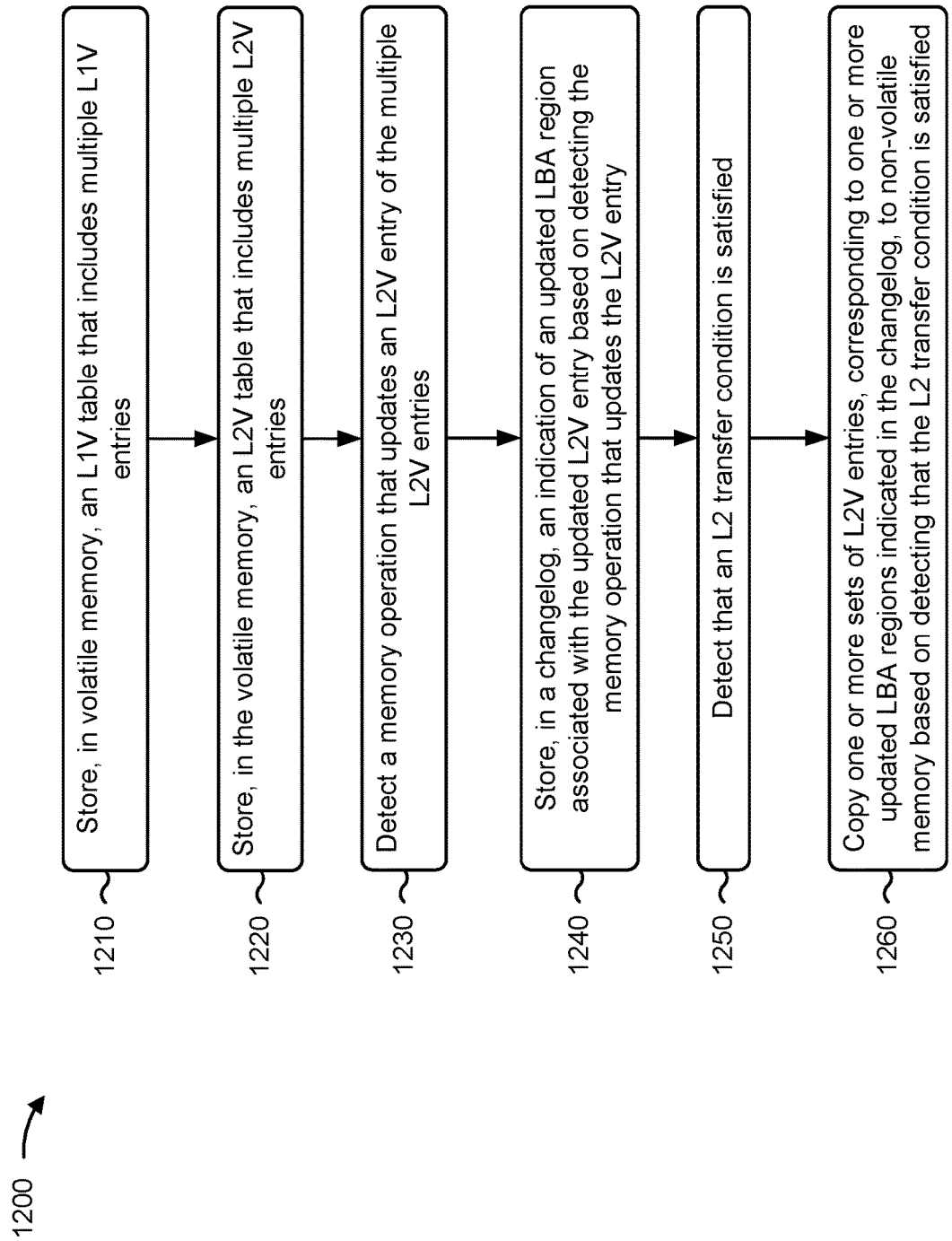
Figure 13:
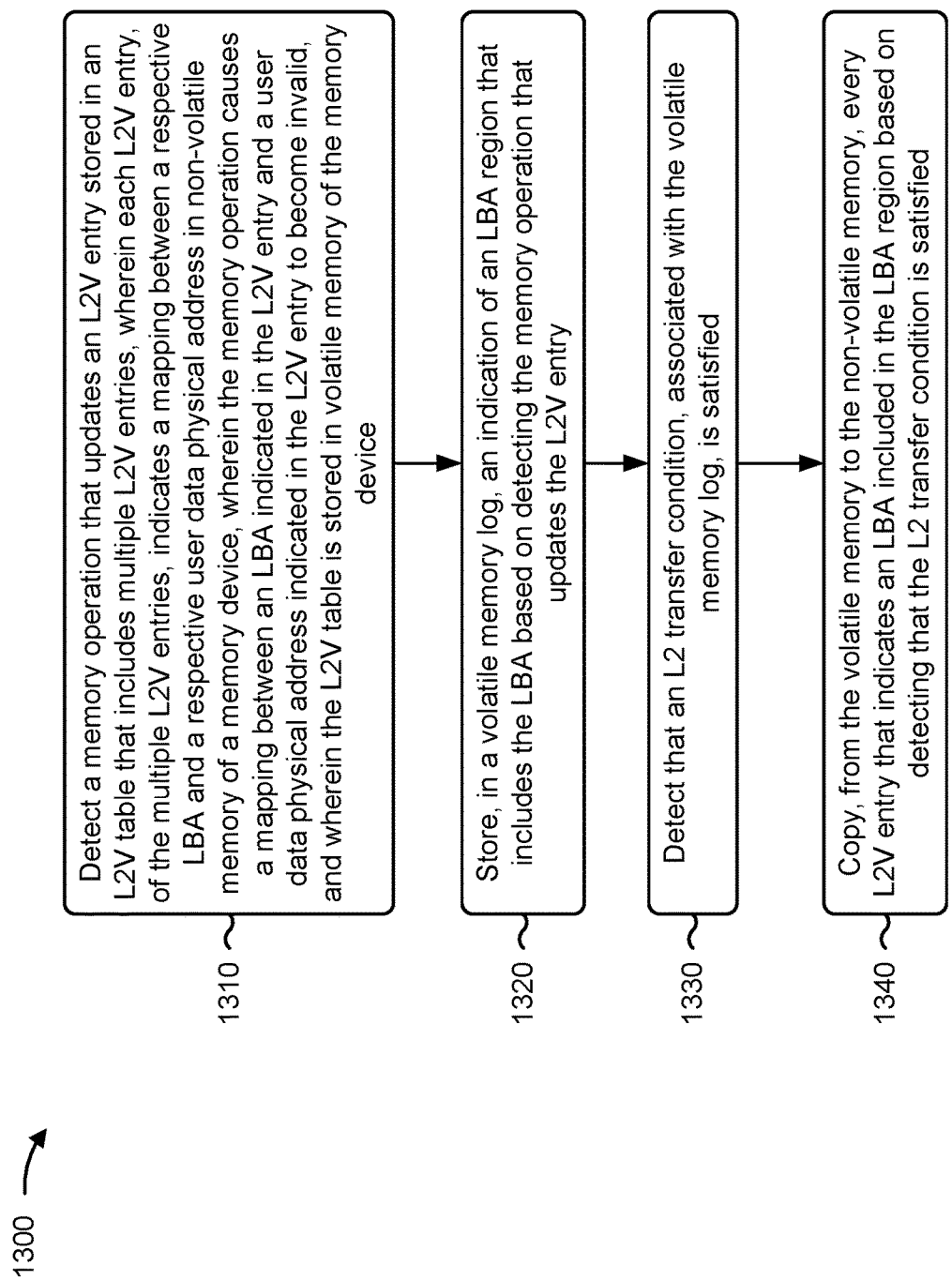

One or more devices or components shown in FIG. 2 may be configured to perform operations described elsewhere herein, such as one or more operations of FIGS. 3-10 and/or one or more process blocks of the methods of FIGS. 11-13. For example, the controller 130, the memory management component 280, and/or the L2P mapping component 290 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
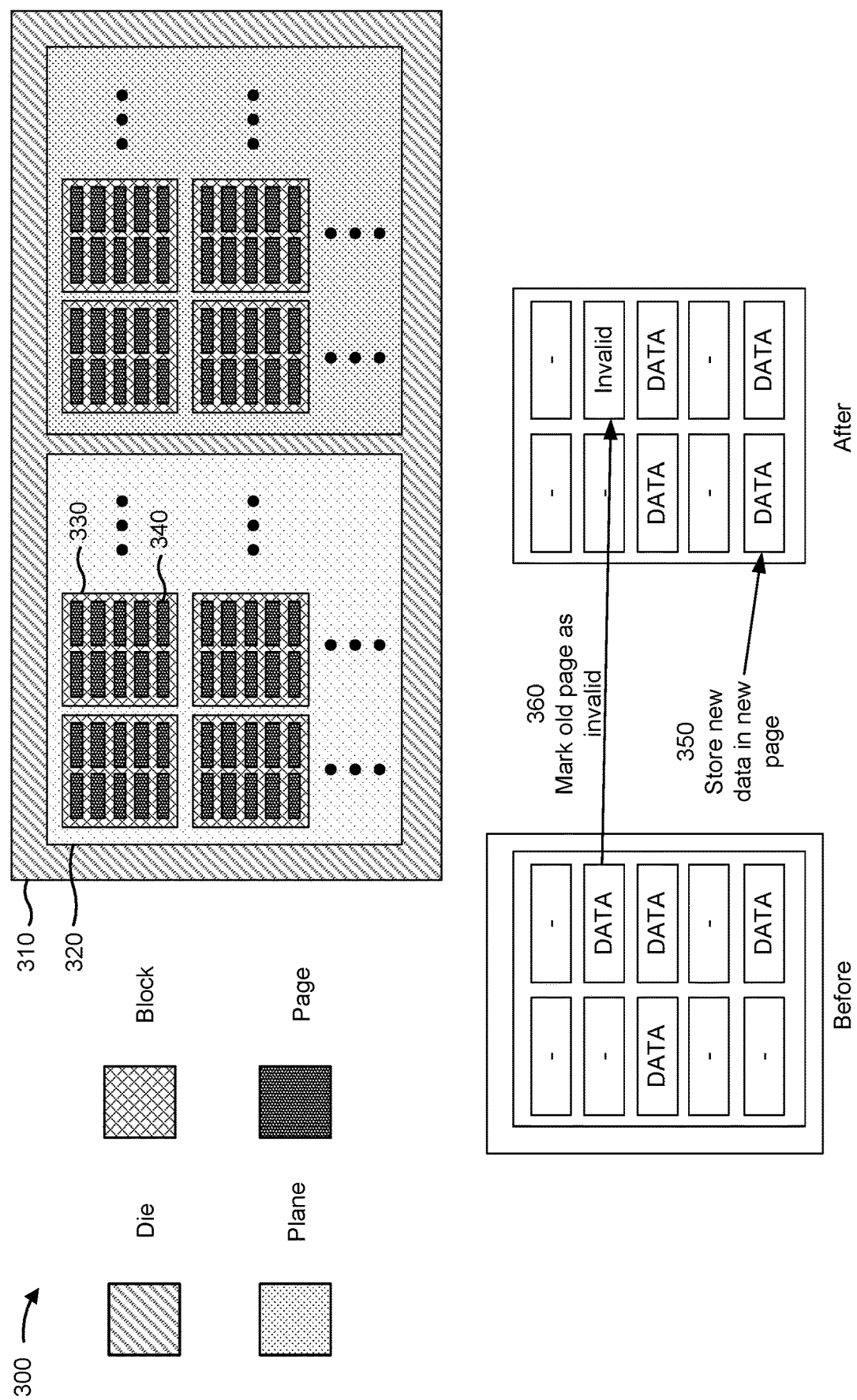
FIG. 3 is a diagram illustrating an example memory architecture that may be used by the memory device.

FIG. 3 is a diagram illustrating an example memory architecture 300 that may be used by the memory device 120. The memory device 120 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. In some implementations, a die 310 is the smallest unit of memory that can independently execute commands. A memory device 120 may include one or more dies 310. In some implementations, the memory device 120 may include multiple dies 310. In this case, multiples dies 310 may each perform a respective memory operation (e.g., a read operation, a write operation, or an erase operation) in parallel. For example, a controller 130 of the memory device 120 may be configured to concurrently perform memory operations on multiple dies 310 for parallel control.

Each die 310 of a memory device 120 includes one or more planes 320. A plane 320 is sometimes called a memory plane. In some implementations, identical and concurrent operations can be performed on multiple planes 320 (sometimes with restrictions). For example, a multi-plane command (e.g., a multi-plane read command or a multi-plane write command) may be executed on multiple planes 320 concurrently, whereas a single plane command (e.g., a single plane read command or a single plane write command) may be executed on a single plane 320. A logical unit of the memory device 120 may include one or more planes 320 of a die 310. In some implementations, a logical unit may include all planes 320 of a die 310 and may be equivalent to a die 310. Alternatively, a logical unit may include fewer than all planes 320 of a die 310. A logical unit may be identified by a logical unit number (LUN). Depending on the context, the term "LUN" may refer to a logical unit or an identifier (e.g., a number) of that logical unit.

Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (i.e., the smallest unit of memory that can be programmed with data). The terminology "programming" memory and "writing to" memory may be used interchangeably. A page 340 may include multiple memory cells that are accessible via the same access line (sometimes called a word line). A physical address of non-volatile memory (sometimes called a non-volatile memory physical address) may indicate, for example, a die 310, a plane 320, a block 330, a page 340, and/or or a portion of the page 340 where data is located. Additionally, or alternatively, a physical address of non-volatile memory may indicate one or more memory cells of the non-volatile memory. Similarly, a physical address of volatile memory (sometimes called a volatile memory physical address) may indicate one or more memory cells of the volatile memory.

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The memory device 120 may then point operations associated with the data to the new page (e.g., in an address table) and may track invalid pages to prevent program operations from being performed on invalid pages prior to an erase operation.

When a block 330 satisfies an erasure condition, the memory device 120 may select the block 330 for erasure, copy the valid data of the block 330 (e.g., to a new block 330 or to the same block 330 after erasure), and erase the block 330. For example, the erasure condition may be that all pages 340 of the block 330 or a threshold quantity or percentage of pages 340 of the block 330 are unavailable for further programming (e.g., are either invalid or already store valid data). As another example, the erasure condition may be that a quantity or percentage of free pages 340 of the block 330 (e.g., pages 340 that are available to be written) is less than or equal to a threshold. The process of selecting a block 330 satisfying an erasure condition, copying valid pages 340 of that block 330 to a new block 330 (or the same block 330 after erasure), and erasing the block 330 is sometimes called garbage collection and is used to free up memory space of the memory device 120.

As indicated above, FIG. 3 is provided as an example. Other examples may differ from what is described with regard to FIG. 3.

Figure 4:
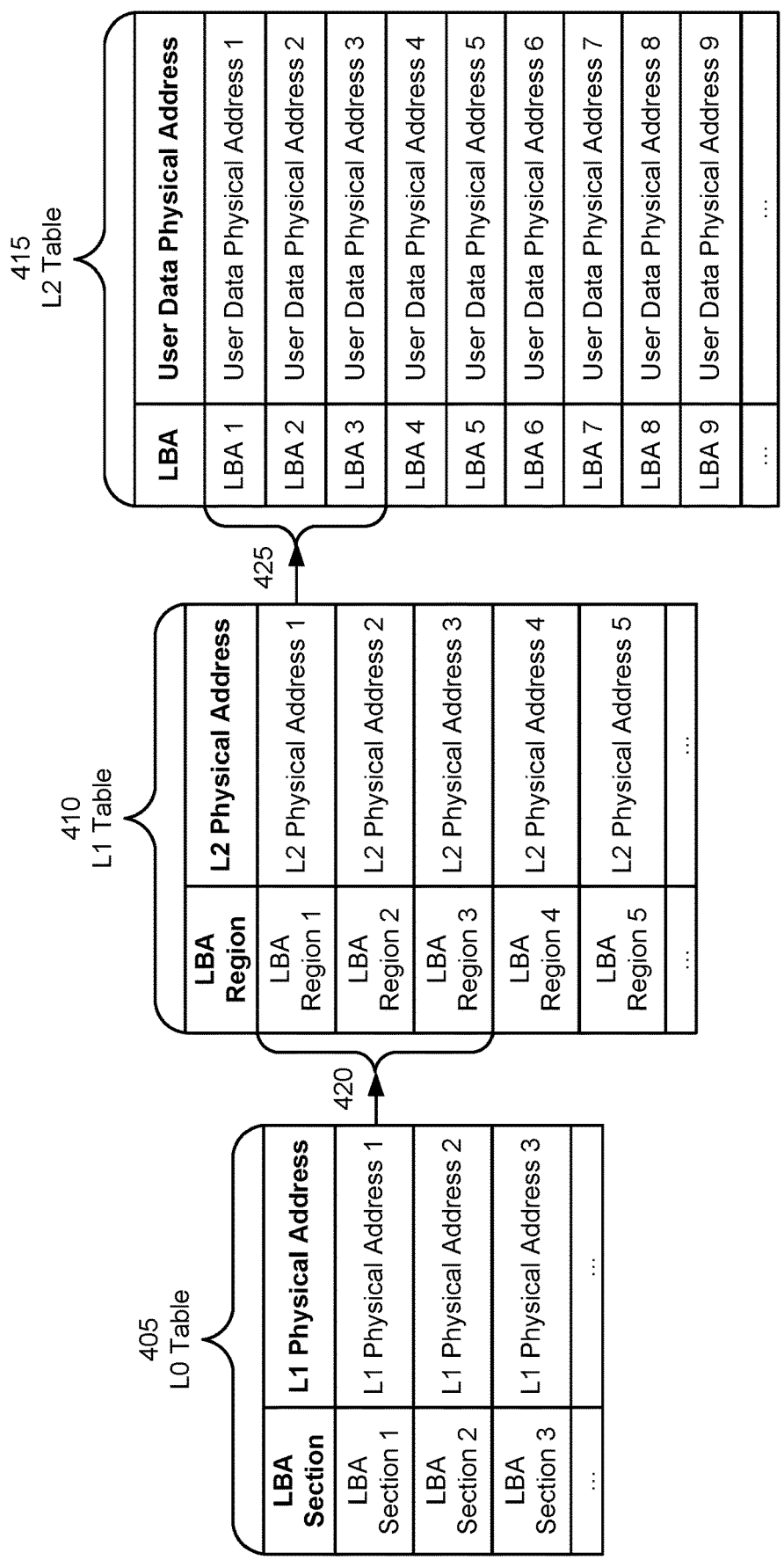
FIG. 4 is a diagram illustrating examples of L2P tables that may be used by the memory device described herein for L2P address mapping with fast L2P table load times.

FIG. 4 is a diagram illustrating examples of L2P tables that may be used by the memory device 120 described herein for L2P address mapping with fast L2P table load times. As shown in FIG. 4, the memory device 120 may store (e.g., in the L2P memory 250) a level zero (L0) table (sometimes called an L0 mapping table), a level one (L1) table (sometimes called an L1 mapping table), and a level two (L2) table (sometimes called an L2 mapping table).

In some implementations, the memory device 120 may store a first L0 table in non-volatile memory, referred to herein as a level zero non-volatile (L0N) table or an L0N mapping table, and may store a second L0 table in volatile memory, referred to herein as a level zero volatile (L0V) table or an L0V mapping table. Similarly, the memory device 120 may store a first L1 table in non-volatile memory, referred to herein as a level one non-volatile (L1N) table or an L1N mapping table, and may store a second L1 table in volatile memory, referred to herein as a level one volatile (L1V) table or an L1V mapping table. Similarly, the memory device 120 may store a first L2 table in non-volatile memory, referred to herein as a level two non-volatile (L2N) table or an L2N mapping table, and may store a second L2 table in volatile memory, referred to herein as a level two volatile (L2V) table or an L2V mapping table.

As shown by reference number 405, an L0 table may be configured to store multiple L0 entries. As further shown, each L0 entry may indicate a correspondence (e.g., a mapping) between an LBA section and an L1 physical address at which L1 entries corresponding to the LBA section are stored. As an example, a first L0 entry in the L0 table indicates that a first LBA section (shown as "LBA Section 1") is associated with a first L1 physical address (shown as "L1 Physical Address 1"), a second L0 entry in the L0 table indicates that a second LBA section (shown as "LBA Section 2") is associated with a second L1 physical address (shown as "L1 Physical Address 2"), and so on. An LBA section may include and/or may be associated with multiple LBA regions. An LBA region may include and/or may be associated with multiple LBAs.

For example, an L0N table may be configured to store multiple L0N entries in non-volatile memory. Each L0N entry may indicate a correspondence (e.g., a mapping) between an LBA section and an L1N physical address at which L1N entries corresponding to the LBA section (e.g., corresponding to a set of LBA regions included in the LBA section) are stored in non-volatile memory. Similarly, an L0V table may be configured to store multiple L0V entries in volatile memory. Each L0V entry may indicate a correspondence (e.g., a mapping) between an LBA section and an L1N physical address at which L1N entries corresponding to the LBA section (e.g., corresponding to a set of LBA regions included in the LBA section) are stored in non-volatile memory.

In some implementations, the L0N table is used during power up to load an L1 table and/or an L2 table into volatile memory. Loading the L1 table and the L2 table into volatile memory enables faster L2P address translation, while maintaining an L1 table and an L2 table in non-volatile memory enables address mappings to be maintained when the memory device 120 is powered off. In some implementations, both the L0N table and the L0V table may point to physical addresses (e.g., of L1N entries) in non-volatile memory. This is because in some implementations the L0V table is not used during runtime to perform address translation. Rather, the L0V table may be used to store updated L2P mappings (e.g., between LBA sections and corresponding sets of L1N entries), which may then be copied to the L0N table in non-volatile memory (e.g., on power down of the memory device 120).

As shown by reference number 410, an L1 table may be configured to store multiple L1 entries. As further shown, each L1 entry may indicate a correspondence (e.g., a mapping) between an LBA region and an L2 physical address at which L2 entries corresponding to the LBA region are stored. As an example, a first L1 entry in the L1 table indicates that a first LBA region (shown as "LBA Region 1") is associated with a first L2 physical address (shown as "L2 Physical Address 1"), a second L1 entry in the L1 table indicates that a second LBA region (shown as "LBA Region 2") is associated with a second L2 physical address (shown as "L2 Physical Address 2"), and so on. As indicated above, an LBA region may include and/or may be associated with multiple LBAs.

For example, an L1N table may be configured to store multiple L1N entries in non-volatile memory. Each L1N entry may indicate a correspondence (e.g., a mapping) between an LBA region and an L2N physical address at which L2N entries corresponding to the LBA region (e.g., corresponding to a set of LBAs included in the LBA region) are stored in non-volatile memory. Additionally, or alternatively, an L1V table may be configured to store multiple L1V entries in volatile memory. Each L1V entry may indicate a correspondence (e.g., a mapping) between an LBA region and an L2V physical address at which L2V entries corresponding to the LBA region (e.g., corresponding to a set of LBAs included in the LBA region) are stored in volatile memory. Additionally, or alternatively, each L1V entry may indicate a correspondence (e.g., a mapping) between an LBA region and an L2N physical address at which L2N entries corresponding to the LBA region (e.g., corresponding to a set of LBAs included in the LBA region) are stored in non-volatile memory. In other words, the L1V table may include pointers to both volatile memory physical addresses for L2 entries (e.g., L2V entries) and non-volatile memory physical addresses for L2 entries (e.g., L2N entries) corresponding to LBA regions. For example, an L1V entry may indicate an LBA region, an L2V physical address associated with that LBA region, and an L2N physical address associated with that LBA region. In some implementations, a first L1V table may include pointers to volatile memory physical addresses for L2 entries (e.g., L2V entries) for LBA regions, and a second L2V table may include pointers to non-volatile memory physical addresses for L2 entries (e.g., L2N entries) for LBA regions.

Storing the L1N table in non-volatile memory enables L2P address mappings to be maintained when the memory device 120 is powered off, and loading and maintaining the L1V table in volatile memory enables faster L2P address translation during runtime (e.g., faster than using the L1N table during runtime). In some implementations, the L1N table may point to non-volatile memory physical addresses of L2N entries, and the L1V table may point to both volatile memory physical addresses of L2V entries and non-volatile memory physical addresses of L2N entries (or there may be two L1V tables, where a first L1V table points to volatile memory physical addresses of L2V entries and a second L1V table points to non-volatile memory physical addresses of L2N entries). The L1V table to L2V table mapping enables faster L2P address translation during runtime, while the L1N table to L2N table mapping enables L2P address translations to be persisted in non-volatile memory.

As shown by reference number 415, an L2 table may be configured to store multiple L2 entries. As further shown, each L2 entry may indicate a correspondence (e.g., a mapping) between an LBA and a user data physical address at which user data (sometimes called host data or host-accessible data) corresponding to the LBA is stored. As an example, a first L2 entry in the L2 table indicates that a first LBA (shown as "LBA 1") is associated with a first user data physical address (shown as "User Data Physical Address 1"), a second L2 entry in the L2 table indicates that a second LBA (shown as "LBA 2") is associated with a second user data physical address (shown as "User Data Physical Address 2"), and so on.

For example, an L2N table may be configured to store multiple L2N entries in non-volatile memory. Each L2N entry may indicate a correspondence (e.g., a mapping) between an LBA and a user data physical address at which user data corresponding to the LBA is stored in non-volatile memory. Similarly, an L2V table may be configured to store multiple L2V entries in volatile memory. Each L2V entry may indicate a correspondence (e.g., a mapping) between an LBA and a user data physical address at which user data corresponding to the LBA is stored in non-volatile memory.

Storing the L2N table in non-volatile memory enables L2P address mappings to be maintained when the memory device 120 is powered off, and loading and maintaining the L2V table in volatile memory enables faster L2P address translation during runtime (e.g., faster than using the L2N table during runtime). In some implementations, the L2N table and the L2V table may both point to non-volatile memory physical addresses of user data because user data is stored in the non-volatile memory (and not the volatile memory). However, in some implementations where user data is copied to volatile memory, the L2V table may point to volatile memory physical addresses of user data.

In some implementations, an L0 entry (e.g., an L0V entry and/or an L0N entry) includes an indication of an LBA section. However, in some implementations, an L0 entry is indexed by an LBA section rather than indicating an LBA section. For example, an LBA section may correspond to an index value included in an L0 entry. Similarly, in some implementations, an L1 entry (e.g., an L1V entry and/or an L1N entry) includes an indication of an LBA region. However, in some implementations, an L1 entry is indexed by an LBA region rather than indicating an LBA region. For example, an LBA region may correspond to an index value included in an L1 entry. Similarly, in some implementations, an L2 entry (e.g., an L2V entry and/or an L2N entry) includes an indication of an LBA. However, in some implementations, an L2 entry is indexed by an LBA rather than indicating an LBA. For example, an LBA may correspond to an index value included in an L2 entry.

As described above, an LBA section may include multiple LBA regions. For example, as shown by reference number 420, a first LBA section (shown as "LBA Section 1") may include a first LBA region (shown as "LBA Region 1"), a second LBA region (shown as "LBA Region 2"), and a third LBA region (shown as "LBA Region 3"). In the first L0 entry, the first LBA section ("LBA Section 1") is associated with a first L1 physical address (shown as "L1 Physical Address 1"). The first L1 physical address is a physical address (e.g., in non-volatile memory for both the L0V table and the L0N table) at which the L1 entries (e.g., L1N entries) associated with the first LBA section are located. For example, the first L1 physical address may point to a physical address at which the first L1 entry, the second L1 entry, and the third L1 entry are located.

In some implementations, an L0 entry may indicate multiple physical addresses. For example, the L0 entry may include a physical address for each L1 entry corresponding to that L0 entry. Alternatively, if each L1 entry is the same size and each LBA section is associated with a fixed quantity of LBA regions, then the L0 entry may include a single physical address that indicates multiple physical addresses at which corresponding L1 entries are stored, which may conserve memory resources by reducing a size of each L0 entry. Although the example of FIG. 4 shows an LBA section that is associated with three LBA regions, a different quantity of LBA regions may be associated with an LBA section in some implementations.

As also described above, an LBA region may include multiple LBAs. For example, as shown by reference number 425, a first LBA region (shown as "LBA Region 1") may include a first LBA (shown as "LBA 1"), a second LBA (shown as "LBA 2"), and a third LBA (shown as "LBA 3"). In the first L1 entry, the first LBA region ("LBA Region 1") is associated with a first L2 physical address (shown as "L2 Physical Address 1"). The first L2 physical address is a physical address (e.g., in non-volatile memory for the L1N table and in volatile memory for the L1V table) at which the L2 entries (e.g., L2N entries for the L1N table and L2V entries for the L1V table) associated with the first LBA region are located. For example, the first L2 physical address may point to a physical address at which the first L2 entry, the second L2 entry, and the third L2 entry are located. In the L1N table, the first L2 physical address may point to a non-volatile memory physical address at which the first L2N entry, the second L2N entry, and the third L2N entry are located. In the L1V table, the first L2 physical address may point to a volatile memory physical address at which the first L2V entry, the second L2V entry, and the third L2V entry are located.

In a similar manner as described above in connection with the L0 table, an L1 entry may indicate multiple physical addresses. For example, the L1 entry may include a physical address for each L2 entry corresponding to that L1 entry. Alternatively, if each L2 entry is the same size and each LBA region is associated with a fixed quantity of LBAs, then the L1 entry may include a single physical address that indicates multiple physical addresses at which corresponding L2 entries are stored, which may conserve memory resources by reducing a size of each L1 entry. Although the example of FIG. 4 shows an LBA region that is associated with three LBAs, a different quantity of LBAs may be associated with an LBA region in some implementations.

During runtime, the memory device 120 may use the L1V table and the L2V table to map one or more LBAs indicated in a command (e.g., a host command received from the host device 110) to one or more corresponding user data physical addresses at which user data, corresponding to the one or more LBAs, is stored in non-volatile memory of the memory device 120. For example, if the memory device 120 receives a read command that indicates LBA 3, the memory device 120 may identify an L1V entry, in the L1V table, that is associated with LBA 3 (e.g., that indicates an LBA region that includes LBA 3). In the example of FIG. 4, the first L1V entry is associated with LBA 3 because the first L1V entry indicates LBA Region 1, which includes LBA 3.

Based on identifying the first L1V entry, the memory device 120 may identify L2 Physical Address 1, which is indicated in the first L1V entry. The memory device 120 may use L2 Physical Address 1 to identify a set of L2V entries, in the L2V table, that are associated with LBA Region 1, shown as the first L2V entry, the second L2V entry, and the third L2V entry. The memory device 120 may identify an L2V entry, from this set of L2V entries, that is associated with LBA 3 (e.g., an L2V entry that indicates LBA 3). In the example of FIG. 4, the third L2V entry is associated with LBA 3 because the third L2V entry indicates LBA 3. Based on identifying the third L2V entry, the memory device 120 may identify User Data Physical Address 3, which is indicated in the third L2V entry. The memory device 120 may read user data from User Data Physical Address 3 and may provide that user data to the host device 110 (e.g., based on the read command received from the host device 110).

Although some implementations are described herein in connection with LBAs, some implementations may use translation units (TUs) rather than LBAs. A TU may include one or more LBAs. For example, if an LBA has a size of 4 kilobytes, a TU may have a size of 4 kilobytes (e.g., 1 TU=1 LBA), 8 kilobytes (e.g., 1 TU=2 LBAs), 12 kilobytes (e.g., 1 TU=3 LBAs), 16 kilobytes (e.g., 1 TU=4 LBAs), or the like. In this case, implementations described herein may use TUs rather than LBAs, TU regions rather than LBA regions, and TU sections rather than LBA sections.

When the memory device 120 receives a write command associated with an LBA (or otherwise writes user data for the LBA to a new location), the current LBA to user data physical address mapping stored in the L2V table for that LBA becomes invalid because new data is stored at a new user data physical address (e.g., in a new page, as described above in connection with FIG. 3). To maintain a valid L2P mapping, the memory device 120 stores, in the L2V table, a new L2V entry that indicates a mapping between the LBA and the new user data physical address. To enable L2P mappings to be persisted across power cycles (e.g., to be stored by the memory device 120 when powered off), the memory device 120 also needs to update the L2N table (e.g., with a new L2N entry that indicates a mapping between the LBA and the new user data physical address), the L1N table (e.g., with a new L1N entry that points to a new L2 physical address of the new L2N entry), and the LON table (e.g., with a new LON entry that points to a new L1 physical address of the new L1N entry).

Updating the L2N table, the L1N table, and the LON table after each write command that updates a mapping between an LBA and a user data physical address would lead to high latency and slow response times to host commands. In some cases, current L2P mappings may be stored in volatile memory, and then the L2N table, the L1N table, and/or the LON table may be updated in non-volatile memory based on detecting a power down event for the memory device 120 (e.g., prior to power loss). This may be possible for expected power down events (e.g., a host command instructing the memory device 120 to power down), although it may result in long power down times. For unexpected power down events, such as asynchronous power loss (APL), there may not be sufficient time to transfer all of the current L2P mappings from volatile memory to non-volatile memory prior to power loss, which would result in data loss, data corruption, and/or low reliability. To address this issue, the memory device 120 may trigger the transfer of one or more current L2P mappings from volatile memory to non-volatile memory during runtime of the memory device 120. This may limit a quantity of L2P mappings in volatile memory that have not yet been transferred to non-volatile memory, and may enable this limited quantity of L2P mappings to be transferred to non-volatile memory during unexpected power down events (e.g., by reducing the time and power consumption needed to perform the transfer).

As an example, the memory device 120 may include journal memory that is updated with a new journal entry each time that an L2 entry is updated (e.g., to indicate a mapping between an LBA and a new user data physical address). The journal memory may include one or more journal pages stored in non-volatile memory and a journal buffer stored in volatile memory. When the journal buffer is full (e.g., a quantity of journal entries and/or a size of those journal entries in the journal buffer satisfies a threshold), the journal buffer may be written to non-volatile memory and reused for additional journal entries. When a quantity of journal entries in the entire journal (e.g., the volatile and non-volatile portions) satisfies a threshold, then the L2V entries corresponding to a particular LBA region (e.g., identified using a pre-determined selection operation, such as a round-robin selection operation) may be stored in non-volatile memory (e.g., as L2N entries in the L2N table). When all of the L2V entries corresponding to an LBA section have been stored in non-volatile memory, then the L1N entries for that LBA section may be updated to point to the L2V entries.

Storing L2P mappings in non-volatile memory in this manner may reduce a quantity of updated L2P mappings that need to be transferred from volatile memory to non-volatile memory upon detecting a power down event. However, using this technique may result in a large journal size because every update to an L2 entry triggers storing of a journal entry. As a result, the amount of time required to load the L1V table and the L2V table to volatile memory upon power up of the memory device 120 and a corresponding time-to-ready (TTR) time of the memory device 120 may be large because every journal entry must be "replayed" to load that journal entry into the L2V table and ensure an accurate mapping.

Some implementations described herein relate to techniques to store L2P mappings in non-volatile memory that may reduce memory overhead for L2P mapping, may reduce a die footprint required for L2P mapping, and may reduce a TTR time and a time to load the L1V table and the L2V table to volatile memory upon power up of a memory device 120.

As indicated above, FIG. 4 is provided as an example. Other examples may differ from what is described with regard to FIG. 4.

Figure 5:
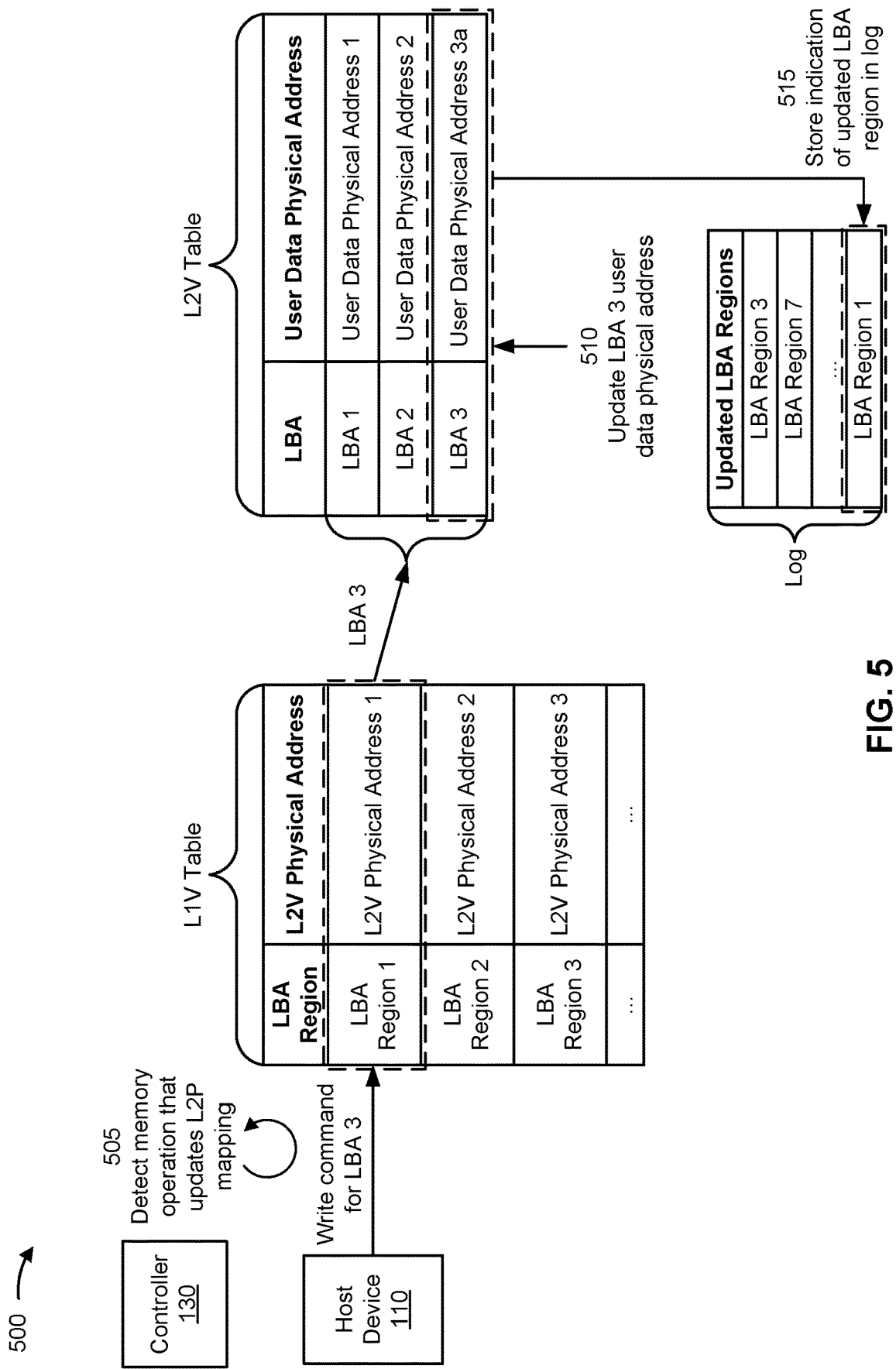
FIGS. 5-10 are diagrams of examples associated with L2P address mapping with fast L2P table load times.

FIG. 5 is a diagram of an example 500 associated with logical to physical address mapping with fast L2P table load times. The operations described in connection with FIG. 5 may be performed by the memory device 120 and/or one or more components of the memory device 120, such as the controller 130 and/or one or more components of the controller 130.

As shown by reference number 505, the memory device 120 (e.g., the controller 130) may detect a memory operation that updates an L2P mapping. For example, the memory device 120 may detect a memory operation that updates an L2V entry (e.g., of multiple L2V entries stored in the L2V table) and/or that updates a mapping between an LBA and a user data physical address corresponding to that LBA. As shown in FIG. 5, in some implementations, the memory operation is a command (e.g., a host command), such as a write command (sometimes called a program command) received from the host device 110. When the memory device 120 writes (or programs) user data for an LBA to non-volatile memory of the memory device 120, the memory device 120 may mark an old user data physical addresses, that was previously associated with the LBA, as invalid and may store new user data in a new user data physical address of the non-volatile memory, as described above in connection with FIG. 3. In this case, the memory device 120 stores an L2P mapping that indicates a correspondence between the LBA and the new user data physical address. For example, the memory device 120 may update an L2V entry, as described below. In some implementations, the memory operation may include an erase operation (e.g., based on an erase command) or another type of memory operation associated with a memory command.

As shown by reference number 510, the memory device 120 may update an L2V entry based on the memory operation. For example, the memory device 120 may store a new user data physical address corresponding to the LBA indicated in the memory operation. For a write command, the memory device 120 may write data for an LBA indicated in the write command to a new user data physical address in non-volatile memory. The memory device 120 may then overwrite an old user data physical address, indicated in the L2V entry for the LBA, with the new user data physical address. Because the L2V entry is stored in volatile memory, the memory device 120 may overwrite the old user data physical address in the L2V entry with the new user data physical address. However, the memory device 120 cannot overwrite the old user data physical address indicated in an L2N entry for the LBA because the L2N entry is stored in non-volatile memory, which is erased at a block level and written at a page level. As a result, operations for updating the L2N entry are more complicated, as described below.

As shown by reference number 515, the memory device 120 may store, in a log, an indication of an updated LBA region associated with the updated L2V entry (e.g., based on detecting the memory operation that updates the L2V entry). The log is sometimes called a changelog or a volatile memory log, and the log may be stored in log memory 260 (e.g., in volatile memory). The log may be configured to store an indication of each LBA region that is associated with an updated L2V entry that has not yet been copied to or updated in the non-volatile memory (e.g., as an L2N entry). The memory device 120 may identify an LBA region that includes the LBA indicated in the updated L2V entry (e.g., the LBA indicated in the memory command and/or affected by the memory operation). Because a mapping between the LBA and a user data physical address has been updated, the LBA region that includes the LBA may be considered an updated LBA region. The memory device 120 may store an indication of the updated LBA region in the log, such as by storing an LBA region identifier in the log.

In some implementations, the memory operation (e.g., a memory command) may indicate multiple LBAs, in which case the memory device 120 may update multiple L2V entries, such as one L2V entry for each LBA for which an L2P mapping has changed as a result of the memory operation. In this case, the memory device 120 may store, in the log, an indication of each updated LBA region. However, to conserve memory resources, the memory device 120 may store, in the log, only a single indication (e.g., a single LBA region identifier) for each updated LBA region. For example, if a first LBA and a second LBA indicated in a memory command are associated with the same LBA region, then the memory device 120 may store only a single LBA region identifier, for that LBA region, in the log. If the first LBA is associated with a first LBA region and the second LBA is associated with a second LBA region, then the memory device 120 may store, in the log, a first LBA region identifier that identifies the first LBA region and a second LBA region identifier that identifies the second LBA region.

Similarly, if the memory device 120 detects a first memory operation that updates a first L2V entry, and then later detects a second memory operation that updates a second L2V entry that is associated with the same LBA region as the first L2V entry (or that updates the first L2V entry again), then the memory device 120 may refrain from storing another indication of the LBA region in the log (e.g., if an indication of the LBA region is already stored in the log, such as before copying L2V entries to non-volatile memory and/or clearing the log). This conserves memory resources by reducing a size of the log.

In the example of FIG. 5, the memory device 120 detects a write command for LBA 3. The memory device 120 identifies LBA Region 1 in the L1V table as corresponding to LBA 3, and identifies L2V Physical Address 1 as corresponding to LBA Region 1. The memory device 120 uses L2V Physical Address 1 to identify a memory location of a set of L2V entries corresponding to LBA Region 1, and identifies an L2V entry corresponding to LBA 3 within that set of L2V entries. The memory device 120 may mark a user data physical address indicated in that L2V entry (e.g., shown as "User Data Physical Address 3" in FIG. 4) as invalid and may store user data for LBA 3 in a new user data physical address in non-volatile memory. The memory device 120 updates the L2V entry to indicate the new user data physical address, shown as "User Data Physical Address 3a." The memory device 120 stores, in the log, an indication of LBA Region 1, which includes LBA 3. As shown, the log may include indications of one or more LBA regions that were previously updated, shown as "LBA Region 3" and "LBA Region 7." When a condition associated with the log is satisfied, the memory device 120 may copy L2V entries to the L2N table, as described below in connection with FIG. 6.

As indicated above, FIG. 5 is provided as an example. Other examples may differ from what is described with regard to FIG. 5.

Figure 6:
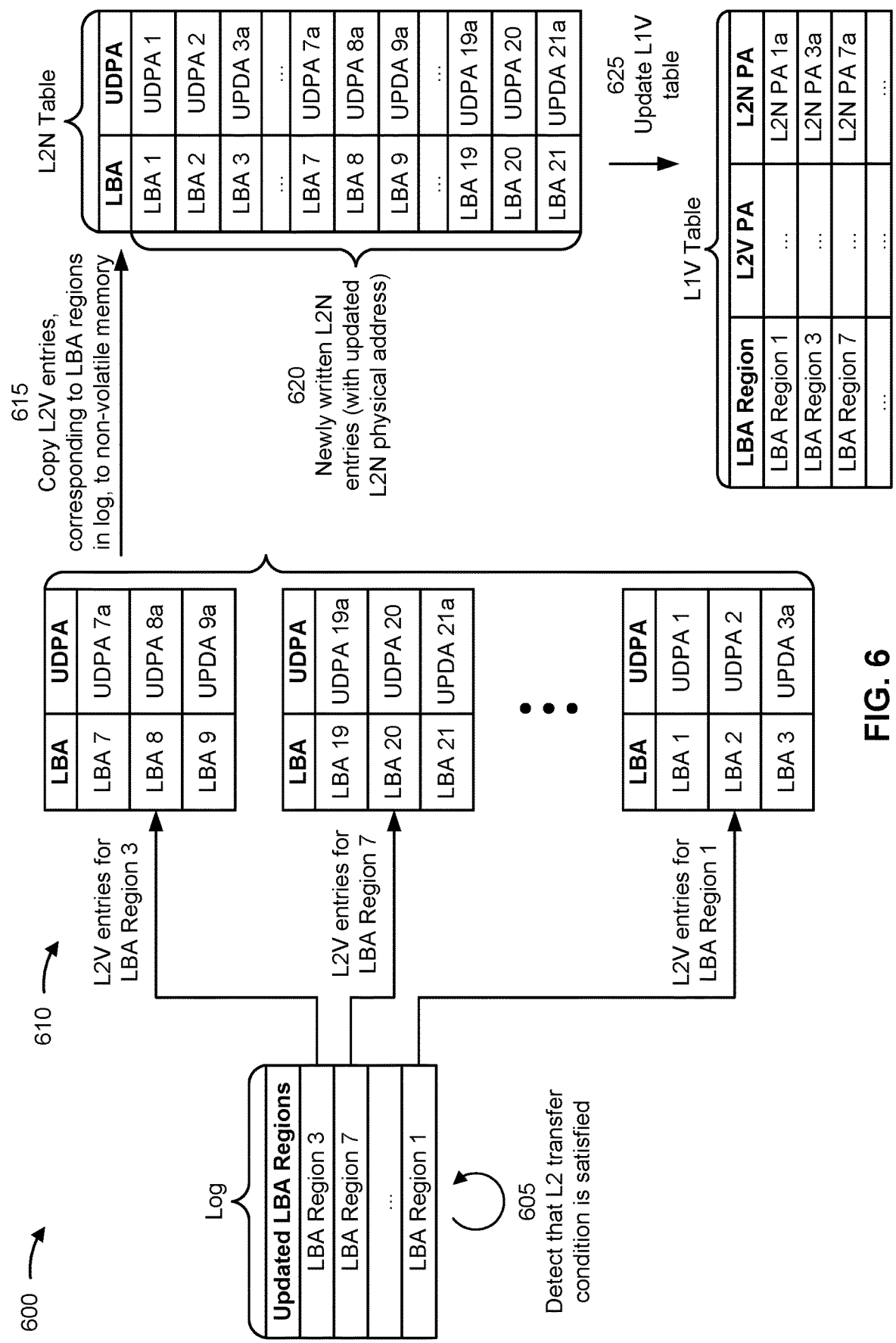

FIG. 6 is a diagram of an example 600 associated with logical to physical address mapping with fast L2P table load times. The operations described in connection with FIG. 6 may be performed by the memory device 120 and/or one or more components of the memory device 120, such as the controller 130 and/or one or more components of the controller 130.

As shown by reference number 605, the memory device 120 may detect that an L2 transfer condition is satisfied. The L2 transfer condition may trigger transfer (e.g., copying) of L2V entries to non-volatile memory (e.g., to an L2N table as L2N entries) and/or updating of an L2N table to reflect L2V entries associated with updated LBA regions indicated in the log. In some implementations, the L2 transfer condition may be associated with the log. For example, the L2 transfer condition may include a quantity of LBA regions, indicated in the log, satisfying a threshold (sometimes called a log threshold or a log memory threshold). For example, if the quantity of LBA regions indicated in the log (e.g., a quantity of LBA region identifiers stored in the log) is greater than or equal to a threshold, then the memory device 120 may determine that the L2 transfer condition is satisfied. This conserves memory resources by limiting a size of the log, and this also ensures that updated L2P mappings are regularly stored in non-volatile memory, which enables those L2P mappings to persist across power cycles. This also limits a quantity of L2P mappings that need to be transferred to non-volatile memory upon detecting a power down event, which can help ensure that all L2P mappings are stored in non-volatile memory before the memory device 120 loses power.

As shown by reference number 610, based on detecting the L2 transfer condition, the memory device 120 may identify sets of L2V entries that correspond to the LBA regions indicated in the log. In some cases, a set of L2V entries corresponding to an LBA region may be called an L2V entry set. As shown in FIG. 6, the memory device 120 may identify a first L2V entry set (e.g., including L2V entries for LBA 7, LBA 8, and LBA 9) corresponding to a first LBA region indicated in the log (e.g., LBA Region 3), may identify a second L2V entry set (e.g., including L2V entries for LBA 19, LBA 20, and LBA 21) corresponding to a second LBA region indicated in the log (e.g., LBA Region 7), may identify a third L2V entry set (e.g., including L2V entries for LBA 1, LBA 2, and LBA 3) corresponding to a third LBA region indicated in the log (e.g., LBA Region 1), and so on.

In some cases, all of the L2V entries in the L2V entry set may have been updated by one or more memory operations, as shown in the first L2V entry set where LBA 7, LBA 8, and LBA 9 are each associated with a new (e.g., updated) user data physical address (UDPA), shown as UDPA 7a for LBA 7, UDPA 8a for LBA 8, and UDPA 9a for LBA 9. In some cases, fewer than all of the L2V entries in the L2V entry set may have been updated by one or more memory operations, as shown in the second L2V entry set (e.g., with a new UDPA 19a for LBA 19 and a new UDPA 21a for LBA 21) and the third L2V entry set (e.g., with a new UDPA 3a for LBA 3, updated as described above in connection with FIG. 5). In any case, at least one of the L2V entries in each of the identified L2V entry sets is updated based on one or more memory operations. In other words, the memory device 120 may identify every L2V entry that indicates an LBA included in an LBA region indicated in the log (e.g., included in any LBA region indicated in the log).

As shown by reference number 615, the memory device 120 may copy one or more sets of L2V entries (e.g., one or more L2V entry sets), corresponding to one or more LBA regions indicated in the log, to non-volatile memory. For example, the memory device 120 may copy each L2V entry included in an identified L2V entry set to non-volatile memory, where each identified L2V entry set corresponds to an LBA region indicated in the log. In other words, the memory device 120 may copy, from volatile memory to non-volatile memory, every L2V entry that indicates an LBA included in an LBA region indicated in the log (e.g., included in any LBA region indicated in the log). The memory device 120 may copy an L2V entry to non-volatile memory by copying the L2V entry to an L2N table as an L2N entry. An L2N entry may include the same information as an L2V entry, such as an indication of an LBA and a corresponding user data physical address at which user data for that LBA is located in non-volatile memory. To copy an L2V entry to the L2N table, the memory device 120 may write a new L2N entry corresponding to the L2V entry (e.g., a new L2N entry that includes the same information as the updated L2V entry, such as an indication of an LBA and a new user data physical address associated with that LBA). Subsequently, the memory device 120 may ignore the old L2N entry.

In some implementations, the memory device 120 may write new L2N entry sets corresponding to the identified L2V entry sets. An L2N entry set may include every L2N entry corresponding to a particular LBA region. For example, the L2N entry for LBA 1, the L2N entry for LBA 2, and the L2N entry for LBA 3 may all be included in the same L2N entry set that corresponds to LBA Region 1. The memory device 120 may write a new L2N entry set rather than writing an individual L2N entry included in the L2N entry set (e.g., without writing the other L2N entries in the L2N entry set) to keep the L2N entries associated with the same LBA region together in the non-volatile memory, such that the L2N entries associated with the same LBA region can be identified using a single L2N physical address.

As shown by reference number 620, copying L2V entries to the L2N table results in newly written L2N entries (e.g., new L2N entries) with updated L2N physical addresses because the new L2N entries are stored in new non-volatile memory physical addresses (e.g., new pages). As a result, L2P mappings stored in L1N entries corresponding to the old L2N entries are no longer valid. An L1N entry indicates a mapping between an LBA region and an L2N physical address at which L2N entries corresponding to that LBA region are stored in non-volatile memory. Because the new L2N entries are written to new pages having new L2N physical addresses, the old L2N physical addresses stored in L1N entries corresponding to the old L2N entries are no longer valid. As a result, the memory device 120 needs to update L1N entries corresponding to the new L2N entries. A first technique for updating L1N entries is described below in connection with FIG. 7, and a second technique for updating L1N entries is described below in connection with FIG. 8.

As shown by reference number 625, the memory device 120 may update the L1V table based on writing new L2N entries to the L2N table. As indicated above, the L1V table may indicate a mapping between an LBA region, a corresponding L2V physical address, and a corresponding L2N physical address. When the memory device 120 writes new L2N entries to non-volatile memory for an LBA region, the memory device 120 may update the L1V table to indicate the new L2N physical address, for those new L2N entries, in connection with the LBA region. In the example 600 of FIG. 6, the memory device 120 updates a first L1V entry associated with LBA Region 1 to indicate a new L2N physical address (shown as L2N PA 1a) for LBA Region 1, updates a second L1V entry associated with LBA Region 3 to indicate a new L2N physical address (shown as L2N PA 3a) for LBA Region 3, and updates a third L1V entry associated with LBA Region 7 to indicate a new L2N physical address (shown as L2N PA 7a) for LBA Region 7. The L2N physical addresses (and corresponding LBA regions) indicated in the L1V table may be used to update an L1N table, as described in more detail below in connection with FIGS. 7 and 8.

As indicated above, FIG. 6 is provided as an example. Other examples may differ from what is described with regard to FIG. 6.

Figure 7:
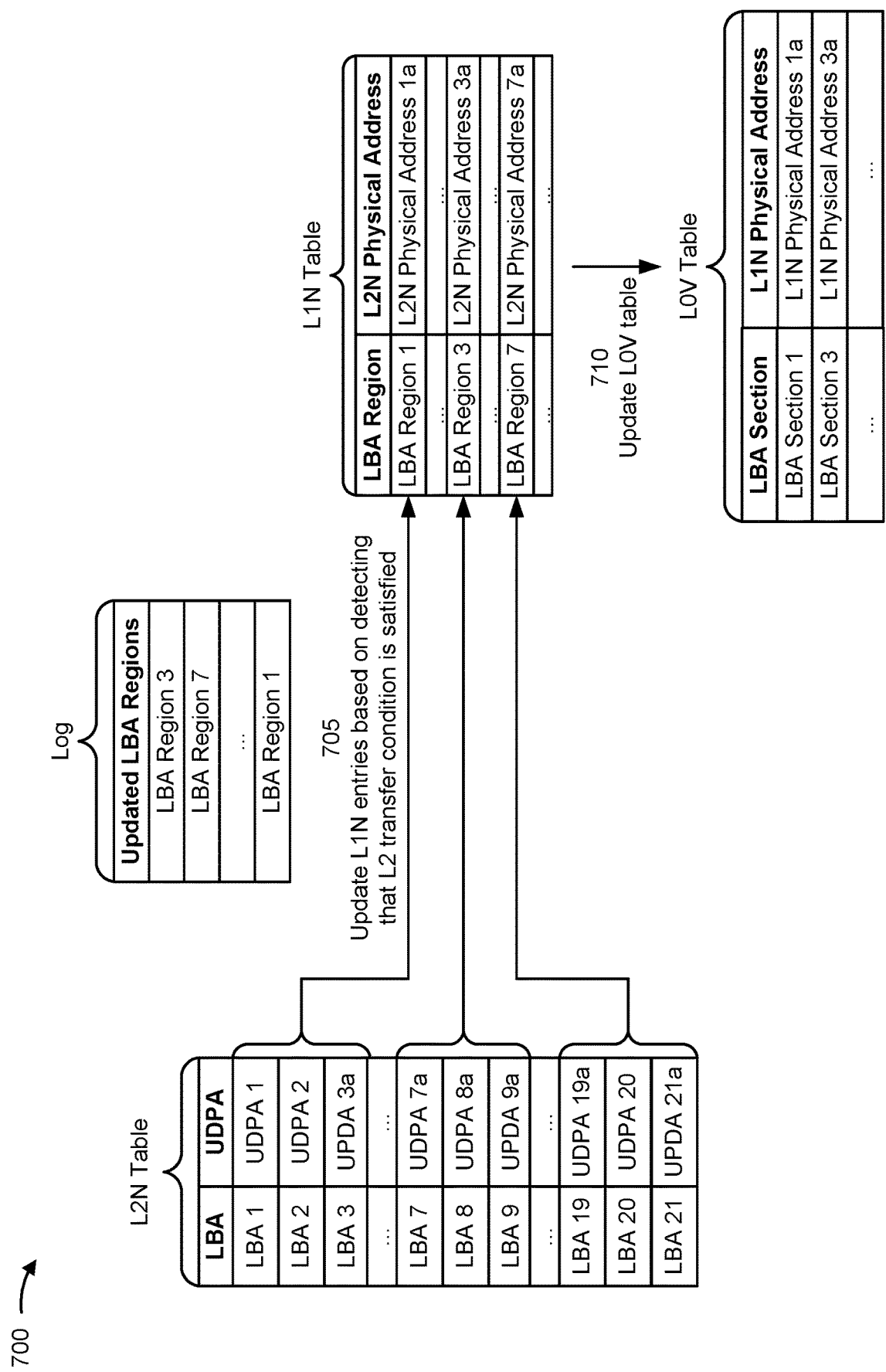

FIG. 7 is a diagram of an example 700 associated with logical to physical address mapping with fast L2P table load times. The operations described in connection with FIG. 7 may be performed by the memory device 120 and/or one or more components of the memory device 120, such as the controller 130 and/or one or more components of the controller 130.

As shown by reference number 705, in some implementations, the memory device 120 may update one or more L1N entries in the non-volatile memory based on detecting that the L2 transfer condition is satisfied (described above in connection with FIG. 6). Additionally, or alternatively, the memory device 120 may update one or more L1N entries based on copying one or more L2V entries to the non-volatile memory (also described above in connection with FIG. 6). In some implementations, the memory device 120 may update an L1N entry corresponding to a new (e.g., updated) L2N entry that was written to the non-volatile memory (e.g., in the L2N table). For example, the memory device 120 may update an L1N entry for each LBA region indicated in the log.

The memory device 120 may identify one or more L1N entries to be updated based on the L2N entries that are newly written to non-volatile memory and/or based on the LBA regions indicated in the log. In some implementations, the memory device 120 may identify one or more sets of L1N entries to be updated based on the new L2N entries (e.g., L1N entries that indicate an LBA region that includes an LBA indicated in a new L2N entry) and/or based on the LBA regions indicated in the log (e.g., L1N entries that indicate an LBA region indicated in the log). For example, the memory device 120 may identify one or more L1N entry sets based on the LBA regions indicated in the log and/or based on the new L2N entries. An L1N entry set may include every L1N entry corresponding to a particular LBA section. For example, the L1N entry for LBA Region 1, the L1N entry for LBA Region 2, and the L1N entry for LBA Region 3 may all be included in the same L1N entry set that corresponds to LBA Section 1 (as described above in connection with FIG. 4). The memory device 120 may write a new L1N entry set rather than writing an individual L1N entry included in the L1N entry set (e.g., without writing the other L1N entries in the L1N entry set) to keep the L1N entries associated with the same LBA section together in the non-volatile memory, such that the L1N entries associated with the same LBA section can be identified using a single L1N physical address.

In some implementations, the memory device 120 may update each L1N entry, included in an identified L1N entry set, in non-volatile memory, where each identified L1N entry set corresponds to an LBA section that includes an LBA region indicated in the log. In other words, the memory device 120 may update, in non-volatile memory, every L1N entry that indicates an LBA region that is included in an LBA section that corresponds to any LBA region indicated in the log. The memory device 120 may update an L1N entry by writing a new L1N entry for the LBA region, such as a new L1N entry that indicates the LBA region and a new L2N physical address for the LBA region. The new L2N physical address may point to the newly written L2N entries corresponding to that LBA region. Subsequently, the memory device 120 may ignore the old L1N entry. In some implementations, the memory device 120 may update an L1N entry based on the L1V table. For example, as indicated above, in addition to indicating mappings between LBA regions and L2V physical addresses, the L1V table may indicate mappings between LBA regions and L2N physical addresses. The memory device 120 may copy, from each L1V entry corresponding to an LBA region to be updated, a corresponding L2N physical address, and may write a new L1N entry that indicates that L2N physical address.

In the example 600 of FIG. 6, the memory device 120 identifies a first L1N entry set that includes L1N entries for LBA Region 1, LBA Region 2, and LBA Region 3 and identifies a second L1N entry set that includes L1N entries for LBA Region 7, LBA Region 8, and LBA Region 9. In some implementations, the memory device 120 may write a new L1N entry for each of these LBA regions (e.g., 1, 2, 3, 7, 8, and 9) even if L2N entries for one or more of these LBA regions have not been updated. In this way, the memory device 120 may keep the L1N entries associated with the same LBA section together in the non-volatile memory, such that the L1N entries associated with the same LBA section can be identified using a single L1N physical address.

As shown by reference number 710, the memory device 120 may update the L0V table (e.g., one or more L0V entries) based on updating one or more L1N entries. For example, the memory device 120 may identify one or more L0V entries to be updated based on one or more L1N entries that have been updated. In some implementations, the memory device 120 may identify an L0V entry to be updated for each L1N entry set that is updated. As described above, the memory device 120 may update an L1N entry set to keep L1N entries associated with the same LBA section together in non-volatile memory. The memory device 120 may identify an L0V entry that indicates an LBA section corresponding to an L1N entry set that was updated. If the memory device 120 updates multiple L1N entry sets, then the memory device 120 may identify an L0V entry for each updated L1N entry set.

The memory device 120 may update each identified L0V entry. For example, the memory device 120 may update an L0V entry by overwriting an old (and invalid) L1N physical address indicated in the L0V entry with a new L1N physical address that points to the new L1N entry set corresponding to the LBA section indicated in the L0V entry. Because the L0V entry is stored in volatile memory, the memory device 120 may overwrite the old L1N physical address in the L0V entry with the new L1N physical address. The memory device 120 may write the L0V table (e.g., with updated L0V entries) to non-volatile memory (as LON entries in an LON table) upon detecting a power down event, as described in more detail elsewhere herein.

In some cases, the technique for updating L1N entries described in connection with FIG. 7 may be called an "L1 on-demand update technique." The L1 on-demand update technique may eliminate the need for the journal memory 270, which may conserve memory resources and reduce memory overhead needed for L2P mapping as compared to the technique described below in connection with FIG. 8. However, the L1 on-demand update technique may require more frequent updates of L1N memory than the technique described below in connection with FIG. 8, which may increase latency for executing memory commands and may also require a large non-volatile memory footprint.

As indicated above, FIG. 7 is provided as an example. Other examples may differ from what is described with regard to FIG. 7.

Figure 8:
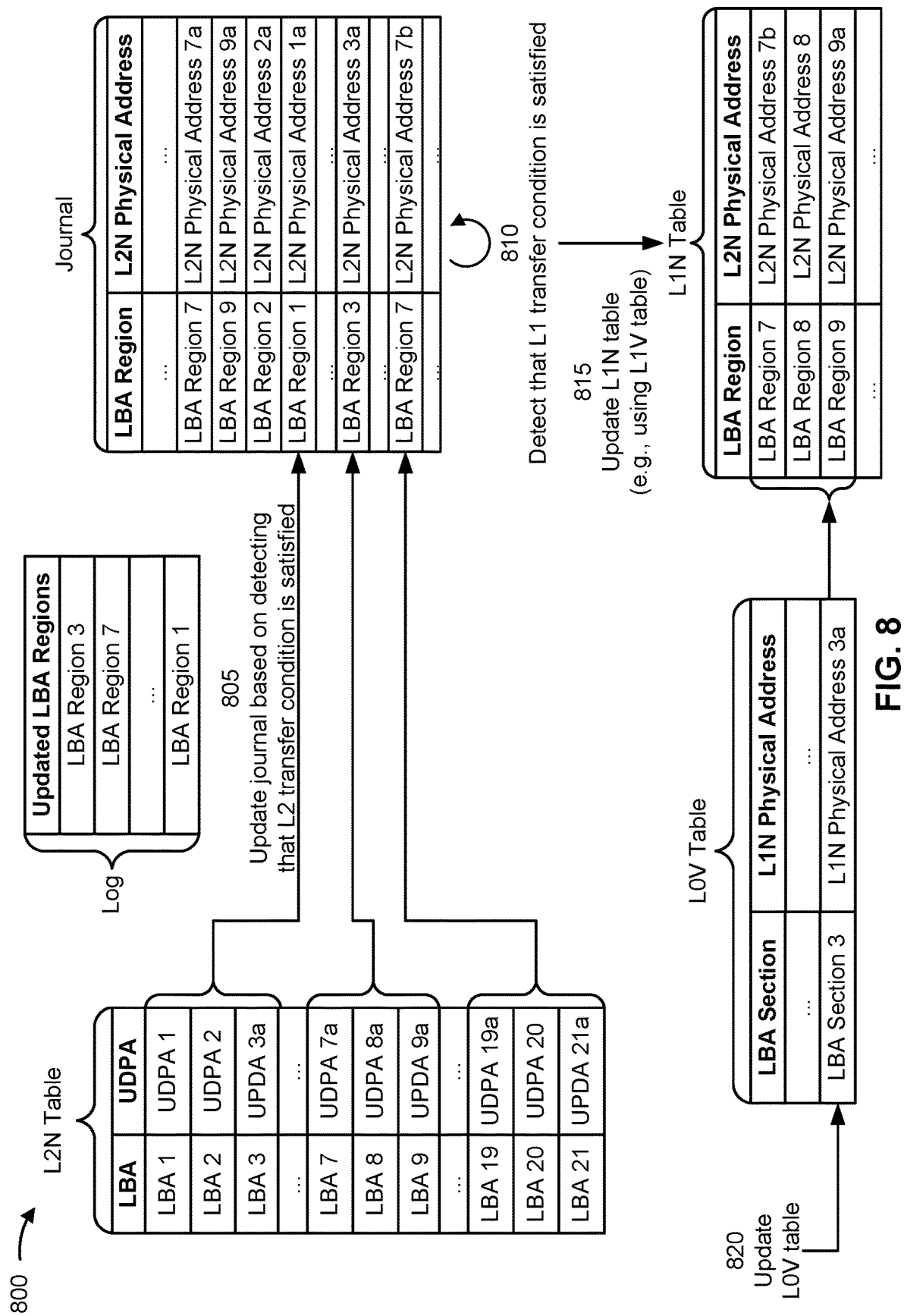

FIG. 8 is a diagram of an example 800 associated with logical to physical address mapping with fast L2P table load times. The operations described in connection with FIG. 8 may be performed by the memory device 120 and/or one or more components of the memory device 120, such as the controller 130 and/or one or more components of the controller 130.

As shown in FIG. 8, the memory device 120 may include a journal. The journal may be stored in the journal memory 270. In some implementations, the journal includes a volatile journal (sometimes called a journal buffer) stored in volatile memory and one or more non-volatile journal pages stored in non-volatile memory. Thus, the journal may include a volatile memory portion of the journal and a non-volatile memory portion of the journal. The journal may store one or more journal entries. A journal entry may indicate a correspondence (e.g., a mapping) between an LBA region and an L2N physical address at which L2N entries corresponding to the LBA region (e.g., corresponding to a set of LBAs included in the LBA region) are stored in non-volatile memory. Thus, in some implementations, the information stored in a journal entry may be the same as the information stored in an L1N entry.

In some implementations, when the journal buffer stored in volatile memory satisfies a condition, such as the size of the journal buffer satisfying a threshold and/or the quantity of journal entries stored in the journal buffer satisfying a threshold, then the memory device 120 may copy the journal buffer to non-volatile memory in one or more journal pages. This reduces volatile memory resources required for the journal buffer and assists with persisting the journal across power cycles.

As shown by reference number 805, in some implementations, the memory device 120 may update the journal based on detecting that the L2 transfer condition is satisfied (described above in connection with FIG. 6). Additionally, or alternatively, the memory device 120 may update the journal based on copying one or more L2V entries to the L2N table in non-volatile memory (also described above in connection with FIG. 6). The memory device 120 may update the journal by writing and/or storing one or more journal entries in the journal.

For example, the memory device 120 may update the journal by writing a journal entry to the journal buffer. A journal entry may correspond to an LBA region (e.g., an updated LBA region) associated with an updated L2V entry. For example, the memory device 120 may write a journal entry for each LBA region indicated in the log. As shown in FIG. 8, the memory device 120 writes a first journal entry for LBA Region 1, writes a second journal entry for LBA Region 3, and writes a third journal entry for LBA Region 7, which are all indicated in the log. The journal entry for an LBA region may indicate a new L2N physical address associated with that LBA region (e.g., a new L2N physical address where L2N entries corresponding to that LBA region are stored in non-volatile memory).

Additionally, or alternatively, the memory device 120 may write a journal entry for each L2N entry set that is newly written to non-volatile memory (described above in connection with FIG. 6). For example, the memory device 120 may write a first journal entry for LBA Region 1 based on the new L2N entry set that includes L2N entries for LBA 1, LBA 2, and LBA 3, may write a second journal entry for LBA Region 3 based on the new L2N entry set that includes L2N entries for LBA 7, LBA 8, and LBA 9, and may write a third journal entry for LBA Region 7 based on the new L2N entry set that includes L2N entries for LBA 19, LBA 20, and LBA 21.

As shown by reference number 810, the memory device 120 may detect that an L1 transfer condition is satisfied. The L1 transfer condition may trigger updating of L1N entries in non-volatile memory (e.g., in an L1N table). In some implementations, the L1 transfer condition may be associated with the journal. For example, the L1 transfer condition may include a quantity of journal entries, indicated in the journal, satisfying a threshold (sometimes called a journal threshold or a journal memory threshold). For example, if the quantity of journal entries indicated in the journal (e.g., in only the non-volatile memory journal, or across both the volatile memory journal and the non-volatile memory journal) is greater than or equal to a threshold, then the memory device 120 may determine that the L1 transfer condition is satisfied. This conserves memory resources by limiting a size of the journal, and this also ensures that updated L2P mappings are regularly stored in non-volatile memory, which enables those L2P mappings to persist across power cycles. This also limits a quantity of L2P mappings that need to be transferred to non-volatile memory upon detecting a power down event, which can help ensure that all L2P mappings are stored in non-volatile memory before the memory device 120 loses power.

As shown by reference number 815, the memory device 120 may update the L1N table based on detecting that the L1 transfer condition is satisfied. In some implementations, the memory device 120 may update a portion of the L1N table. For example, the memory device 120 may update one or more L1N entry sets in the L1N table. As described above, an L1N entry set may include every L1N entry corresponding to a particular LBA section. In some implementations, the memory device 120 may update L1N entry sets in a round-robin manner. For example, the memory device 120 may identify a next one or more L1N entry sets to be updated based on most recent L1N entry sets that were updated (e.g., based on a prior instance of updating the L1N table). In some implementations, the memory device 120 may update an L1N entry set based on the L1V table. For example, as indicated above, in addition to indicating mappings between LBA regions and L2V physical addresses, the L1V table may indicate mappings between LBA regions and L2N physical addresses. The memory device 120 may copy L2N physical addresses indicated in L1V entries included in the L1V entry set corresponding to an LBA section to be updated, and may write those L2N physical addresses to a new L1N entry set corresponding to the LBA section to be updated.

In some implementations, the memory device 120 may identify a single L1N entry set to be updated in the L1N table. For example, the memory device 120 may identify a next L1N entry set to be updated based on a most recent L1N entry set that was updated (e.g., in a prior, most recent instance of updating the L1N table). In other words, the memory device 120 may identify a single LBA section to be updated, and may update the L1N entries associated with that LBA section. The memory device 120 may identify a next LBA section, for which L1N entries are to be updated, based on a most recent LBA section for which L1N entries were updated.

In example 800 of FIG. 8, the most recent LBA section that was updated is LBA Section 2, corresponding to an L1N entry set that includes an L1N entry for LBA Region 4, an L1N entry for LBA Region 5, and an L1N entry for LBA Region 6. Based on the most recently updated LBA section being LBA Section 2, the memory device 120 identifies LBA Section 3 as the next LBA section to be updated. LBA Section 3 is associated with an LBA entry set that includes an L1N entry for LBA Region 7, an L1N entry for LBA Region 8, and an L1N entry for LBA Region 9. Thus, the memory device 120 may update this L1N entry set in the L1N table.

In some implementations, updating an L1N entry set in the L1N table may include copying L2N physical addresses, corresponding to the L1N entry set, from the L1V table (e.g., from an L1V entry set associated with the same LBA section as the L1N entry set) and writing those L2N physical addresses to L1N entries associated with the LBA section to be updated. Thus, updating an L1N entry set in the L1N table may include identifying one or more L1V entries (e.g., an L1V entry set) associated with the L1N entry set and copying the one or more L1V entries (or relevant fields of the one or more L1V entries, such as the LBA region identifier and/or the L2N physical address) to the L1N table. Because the L2N physical addresses stored in the L1V table are updated when new L2N entries are written to non-volatile memory (e.g., to the L2N table), the L2N physical addresses are always kept up-to-date. Thus, copying the L2N physical addresses from the L1V table to the L1N table enables accurate L2P mappings to be transferred to non-volatile memory.

As shown by reference number 820, the memory device 120 may update the L0V table (e.g., one or more L0V entries) based on updating one or more L1N entries. For example, the memory device 120 may identify one or more L0V entries to be updated based on one or more L1N entry sets (e.g., corresponding to one or more LBA sections) that have been updated. In some implementations, the memory device 120 may identify a single L0V entry to be updated based on a single L1N entry set that is updated. For example, the memory device 120 may identify an L0V entry that indicates an LBA section corresponding to an L1N entry set that was updated.

The memory device 120 may update the identified L0V entry. For example, the memory device 120 may update an L0V entry by overwriting an old (and invalid) L1N physical address indicated in the L0V entry with a new L1N physical address that points to the new L1N entry set corresponding to the LBA section indicated in the L0V entry. Because the L0V entry is stored in volatile memory, the memory device 120 may overwrite the old L1N physical address in the L0V entry with the new L1N physical address. In example 800 of FIG. 8, the memory device 120 updates an L0V entry for LBA Section 3 with a new L1N physical address, shown as "L1N Physical Address 3a," which points to a non-volatile memory location where the L1N entries for LBA Region 7, LBA Region 8, and LBA Region 9 are stored. The memory device 120 may write the L0V table (e.g., with updated L0V entries) to non-volatile memory (as LON entries in an LON table) upon detecting a power down event, as described in more detail elsewhere herein.

In some cases, the technique for updating L1N entries described in connection with FIG. 8 may be called an "L1 round-robin update technique." The L1 round-robin update technique may require less frequent updates of L1N memory than the L1 on-demand update technique described above in connection with FIG. 7, which may decrease latency for executing memory commands and may also reduce a non-volatile memory footprint for the L1N table. However, the L1 round-robin technique requires the journal memory 270 and creation of journal entries, which may require more memory resources and result in memory overhead for L2P mapping as compared to the L1 on-demand update technique described above in connection with FIG. 7.

As indicated above, FIG. 8 is provided as an example. Other examples may differ from what is described with regard to FIG. 8.

FIG. 9 is a diagram of an example 900 associated with logical to physical address mapping with fast L2P table load times. The operations described in connection with FIG. 9 may be performed by the memory device 120 and/or one or more components of the memory device 120, such as the controller 130 and/or one or more components of the controller 130.

FIG. 9 shows example power down sequences for the memory device 120. As shown by reference number 905, the memory device 120 may detect a power down event. For example, the memory device 120 may receive a command from the host device 110 that instructs the memory device 120 to power down. Additionally, or alternatively, the memory device 120 may detect an asynchronous power loss (APL) condition, such as by detecting a voltage drop that satisfies a threshold. Based on detecting the power down event, the memory device 120 may update the L2N table, the L1N table, and the LON table so that L2P mappings can be maintained across power cycles and be used by the memory device 120 after subsequent power up.

As shown by reference number 910, based on detecting the power down event, the memory device 120 may copy one or more sets of L2V entries (e.g., one or more L2V entry sets), corresponding to one or more LBA regions indicated in the log, to non-volatile memory, as described above in connection with reference number 615 of FIG. 6. In this case, the L2 transfer condition is the detection of the power down event, and the L2 transfer condition is satisfied based on detecting the power down event.

As shown by reference number 915, in some implementations, the memory device 120 may update one or more L1N entries in the non-volatile memory, as described above in connection with reference number 705 of FIG. 7. In some implementations, the memory device 120 may update the one or more L1N entries (e.g., may update the L1N table) based on detecting the power down event if the memory device 120 uses the L1 on-demand update technique described above in connection with FIG. 7.

As shown by reference number 920, in some implementations, the memory device 120 may update the journal, as described above in connection with reference number 805 of FIG. 8. For example, the memory device 120 may store one or more journal entries in volatile journal memory. If the volatile journal memory becomes full before the memory device 120 has finished adding all journal entries, then the memory device 120 may copy the volatile journal memory to the non-volatile journal memory and may then write any remaining journal entries to the volatile journal memory. As shown by reference number 925, the memory device 120 may copy the volatile journal to the non-volatile journal. For example, the memory device 120 may copy all journal entries stored in the journal buffer to one or more journal pages of non-volatile memory. In some implementations, the memory device 120 may update the journal and copy the volatile journal to the non-volatile journal based on detecting the power down event if the memory device 120 uses the L1 round-robin update technique described above in connection with FIG. 8.

As shown by reference number 930, regardless of which update technique is used by the memory device 120, the memory device 120 may update the L0V table, as described above in connection with reference number 710 of FIG. 7 (e.g., for the L1 on-demand update technique) and in connection with reference number 820 of FIG. 8 (e.g., for the L1 round-robin update technique). As shown by reference number 935, the memory device 120 may copy the L0V table to non-volatile memory as the LON table. In this way, the memory device 120 may maintain valid L2P mappings across power cycles.

As indicated above, FIG. 9 is provided as an example. Other examples may differ from what is described with regard to FIG. 9.

FIG. 10 is a diagram of an example 1000 associated with logical to physical address mapping with fast L2P table load times. The operations described in connection with FIG. 10 may be performed by the memory device 120 and/or one or more components of the memory device 120, such as the controller 130 and/or one or more components of the controller 130.

As shown by reference number 1005, the memory device 120 (e.g., the controller 130) may detect a power up event. For example, the memory device 120 may receive power, may be powered up, may receive a power up command from the host device 110, or the like. The memory device 120 may initiate a power up sequence based on detecting the power up event. The power up sequence may include loading L2P mappings from non-volatile memory to volatile memory to enable faster L2P mapping (e.g., address translation) during runtime.

As shown by reference number 1010, the memory device 120 may copy the LON table to volatile memory as the L0V table. In some implementations, the LON table is stored in a preconfigured memory location (e.g., a particular memory block or memory page), and an indication of that preconfigured memory location is stored in non-volatile memory of the memory device 120 that is accessed by the memory device 120 based on detecting the power up event.

As shown by reference number 1015, the memory device 120 may use the L0V table to identify non-volatile physical addresses in which the L1N table is stored (e.g., physical addresses in which L1N entries of the L1N table are stored). For example, the L0V table shown in FIG. 10 indicates that L1N entries corresponding to LBA Section 1 are stored in L1N Physical Address (shown as "PA") 1a. The memory device 120 may load the L1N entries stored in that physical address to the L1V table (e.g., to store L2N physical addresses in the L1V table), and may perform a similar operation to load the L1N entries for each LBA section to the L1V table.

In some implementations, such as if the memory device 120 uses the L1 on-demand update technique, the memory device 120 may use the L2N physical addresses indicated in the loaded L1V table to locate the L2N entries, and may load those L2N entries into volatile memory as L2V entries (e.g., in the L2V table). The memory device 120 may load the L1V table with L1V entries that point to the appropriate L2V physical addresses in the volatile memory. In some implementations, the memory device 120 may store a single L1V table, where L1V entries include both an L2V physical address and an L2N physical address for an LBA region. Alternatively, the memory device may store a first L1V table that stores L1V entries that include an L2V physical address for an LBA region, and may store a second L1V table that stores L1V entries that include an L2N physical address for an LBA region.

As shown by reference number 1020, in some implementations, such as if the memory device 120 uses the L1 round-robin update technique, the memory device 120 may identify one or more non-volatile journal pages. For example, the memory device 120 may identify one or more journal entries (e.g., in the non-volatile journal pages) indicating one or more changes to an LBA region that have occurred since a most recent update of that LBA region in the non-volatile memory (e.g., before a prior power down and/or before the LBA section, that includes the LBA region indicated in the journal entry, was updated in non-volatile memory), and may perform that operation for each LBA region to identify journal entries to be used to update the L1V table and/or the L2V table.

As shown by reference number 1025, the memory device 120 may generate the L1V table and/or the L2V table based on the L1N table and the identified journal pages. For example, if an L1N entry does not have a corresponding journal entry (e.g., indicating an update to an L2N physical address indicated in that L1N entry), then the memory device 120 may use the L2N physical addresses indicated in the L1N entry in the L1N table to locate the L2N entries associated with that L1N entry, and may load those L2N entries into volatile memory as L2V entries (e.g., in the L2V table). The memory device 120 may update that L1V entry to point to the appropriate L2V physical addresses in the volatile memory.

If an L1N entry has a corresponding journal entry (e.g., indicating an update to an L2N physical address indicated in that L1N entry), then the memory device 120 may use the L2N physical addresses indicated in the journal entry (e.g., a most recent journal entry corresponding to the L1N entry) to locate the L2N entries associated with that L1N entry, and may load those L2N entries into volatile memory as L2V entries (e.g., in the L2V table). The memory device 120 may update that L1V entry to point to the appropriate L2V physical addresses in the volatile memory.

Using the techniques described herein may reduce an amount of time required to load L2P mappings into volatile memory. In some cases, a load time (e.g., an L2P table rebuild time and/or a time-to-ready time) may be as short as two seconds even for very large capacity drives (e.g., 4 terabytes, 16 terabytes, 32 terabytes, 128 terabytes, or more), whereas the load time may be as long as 20 seconds, 50 seconds, 100 seconds, or 3 minutes for large capacity drives using other techniques to load L2P mappings into volatile memory.

As indicated above, FIG. 10 is provided as an example. Other examples may differ from what is described with regard to FIG. 10.

FIG. 11 is a flowchart of an example method 1100 associated with L2P address mapping with fast L2P table load times. In some implementations, a memory device (e.g., memory device 120) may perform or may be configured to perform one or more process blocks of FIG. 11. In some implementations, another device or a group of devices separate from or including the memory device (e.g., the system 100) may perform or may be configured to perform one or more process blocks of FIG. 11. Additionally, or alternatively, one or more components of the memory device (e.g., the controller 130, the memory management component 280 and/or the L2P mapping component 290) may perform or may be configured to perform one or more process blocks of FIG. 11.

As shown in FIG. 11, the method 1100 may include copying one or more sets of L2V entries, corresponding to LBA regions indicated in log memory, to an L2N table stored in non-volatile memory based on an L2 transfer condition (block 1110). As further shown in FIG. 11, the method 1100 may include updating one or more L2N physical addresses, associated with the LBA regions indicated in the log memory, in the L1V table based on the L2 transfer condition (block 1120). As further shown in FIG. 11, the method 1100 may include updating an L1N table stored in the non-volatile memory based on an L1 transfer condition (block 1130).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein, such as the operations described in connection with FIGS. 1-10 and/or 12-13.

FIG. 12 is a flowchart of an example method 1200 associated with L2P address mapping with fast L2P table load times. In some implementations, a memory device (e.g., memory device 120) may perform or may be configured to perform one or more process blocks of FIG. 12. In some implementations, another device or a group of devices separate from or including the memory device (e.g., the system 100) may perform or may be configured to perform one or more process blocks of FIG. 12. Additionally, or alternatively, one or more components of the memory device (e.g., the controller 130, the memory management component 280 and/or the L2P mapping component 290) may perform or may be configured to perform one or more process blocks of FIG. 12.

As shown in FIG. 12, the method 1200 may include storing, in volatile memory, an L1V table that includes multiple L1V entries (block 1210). As further shown in FIG. 12, the method 1200 may include storing, in the volatile memory, an L2V table that includes multiple L2V entries (block 1220). As further shown in FIG. 12, the method 1200 may include detecting a memory operation that updates an L2V entry of the multiple L2V entries (block 1230). As further shown in FIG. 12, the method 1200 may include storing, in a changelog, an indication of an updated LBA region associated with the updated L2V entry based on detecting the memory operation that updates the L2V entry (block 1240). As further shown in FIG. 12, the method 1200 may include detecting that an L2 transfer condition is satisfied (block 1250). As further shown in FIG. 12, the method 1200 may include copying one or more sets of L2V entries, corresponding to one or more updated LBA regions indicated in the changelog, to non-volatile memory based on detecting that the L2 transfer condition is satisfied (block 1260).

Although FIG. 12 shows example blocks of a method 1200, in some implementations, the method 1200 may include additional blocks, fewer blocks, different blocks, or differently arranged blocks than those depicted in FIG. 12. Additionally, or alternatively, two or more of the blocks of the method 1200 may be performed in parallel. The method 1200 is an example of one method that may be performed by one or more devices described herein. These one or more devices may perform or may be configured to perform one or more other methods based on operations described herein, such as the operations described in connection with FIGS. 1-11 and/or 13.

FIG. 13 is a flowchart of an example method 1300 associated with L2P address mapping with fast L2P table load times. In some implementations, a memory device (e.g., memory device 120) may perform or may be configured to perform one or more process blocks of FIG. 13. In some implementations, another device or a group of devices separate from or including the memory device (e.g., the system 100) may perform or may be configured to perform one or more process blocks of FIG. 13. Additionally, or alternatively, one or more components of the memory device (e.g., the controller 130, the memory management component 280 and/or the L2P mapping component 290) may perform or may be configured to perform one or more process blocks of FIG. 13.

As shown in FIG. 13, the method 1300 may include detecting a memory operation that updates an L2V entry stored in an L2V table that includes multiple L2V entries, wherein each L2V entry, of the multiple L2V entries, indicates a mapping between a respective LBA and a respective user data physical address in non-volatile memory of a memory device, wherein the memory operation causes a mapping between an LBA indicated in the L2V entry and a user data physical address indicated in the L2V entry to become invalid, and wherein the L2V table is stored in volatile memory of the memory device (block 1310). As further shown in FIG. 13, the method 1300 may include storing, in a volatile memory log, an indication of an LBA region that includes the LBA based on detecting the memory operation that updates the L2V entry (block 1320). As further shown in FIG. 13, the method 1300 may include detecting that an L2 transfer condition, associated with the volatile memory log, is satisfied (block 1330). As further shown in FIG. 13, the method 1300 may include copying, from the volatile memory to the non-volatile memory, every L2V entry that indicates an LBA included in the LBA region based on detecting that the L2 transfer condition is satisfied (block 1340).

Although FIG. 13 shows example blocks of a method 1300, in some implementations, the method 1300 may include additional blocks, fewer blocks, different blocks, or differently arranged blocks than those depicted in FIG. 13. Additionally, or alternatively, two or more of the blocks of the method 1300 may be performed in parallel. The method 1300 is an example of one method that may be performed by one or more devices described herein. These one or more devices may perform or may be configured to perform one or more other methods based on operations described herein, such as the operations described in connection with FIGS. 1-12.

In some implementations, a memory device includes a level one volatile (L1V) table configured to store multiple L1V entries in volatile memory; a level two volatile (L2V) table configured to store multiple L2V entries in the volatile memory, wherein each L2V entry, of the multiple L2V entries, is configured to indicate a correspondence between a logical block address (LBA) and a user data physical address in non-volatile memory, wherein each L1V entry, of the multiple L1V entries, is configured to indicate a correspondence between an LBA region, associated with multiple LBAs, and a level two non-volatile (L2N) physical address at which corresponding L2N entries are stored; log memory configured to store an indication of each LBA region that is associated with an updated L2V entry that has not yet been copied to the non-volatile memory; journal memory configured to store journal entries corresponding to LBA regions associated with updated L2V entries; and a controller configured to: copy one or more sets of L2V entries, corresponding to LBA regions indicated in the log memory, to a level two non-volatile (L2N) table stored in the non-volatile memory based on an L2 transfer condition; update one or more L2N physical addresses, associated with the LBA regions indicated in the log memory, in the L1V table based on the L2 transfer condition; and update a level one non-volatile (L1N) table stored in the non-volatile memory based on an L1 transfer condition.

In some implementations, a memory device includes one or more components configured to: store, in volatile memory, a level one volatile (L1V) table that includes multiple L1V entries; store, in the volatile memory, a level two volatile (L2V) table that includes multiple L2V entries, wherein each L2V entry, of the multiple L2V entries, indicates a correspondence between a logical block address (LBA) and a user data physical address in non-volatile memory, wherein each L1V entry, of the multiple L1V entries, indicates a correspondence between an LBA region, associated with a set of LBAs, and a level two non-volatile (L2N) physical address at which a set of L2N entries, corresponding to the set of LBAs, is stored; detect a memory operation that updates an L2V entry of the multiple L2V entries; store, in a changelog, an indication of an updated LBA region associated with the updated L2V entry based on detecting the memory operation that updates the L2V entry; detect that an L2 transfer condition is satisfied; and copy one or more sets of L2V entries, corresponding to one or more updated LBA regions indicated in the changelog, to the non-volatile memory based on detecting that the L2 transfer condition is satisfied.

In some implementations, a method includes detecting, by a memory device, a memory operation that updates a level two volatile (L2V) entry stored in an L2V table that includes multiple L2V entries, wherein each L2V entry, of the multiple L2V entries, indicates a mapping between a respective logical block address (LBA) and a respective user data physical address in non-volatile memory of the memory device, wherein the memory operation causes a mapping between an LBA indicated in the L2V entry and a user data physical address indicated in the L2V entry to become invalid, and wherein the L2V table is stored in volatile memory of the memory device; storing, by the memory device and in a volatile memory log, an indication of an LBA region that includes the LBA based on detecting the memory operation that updates the L2V entry; detecting, by the memory device, that an L2 transfer condition, associated with the volatile memory log, is satisfied; and copying, by the memory device and from the volatile memory to the non-volatile memory, every L2V entry that indicates an LBA included in the LBA region based on detecting that the L2 transfer condition is satisfied.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of"). Furthermore, as used herein, the term "set" may include one or more items.

What is claimed is:

1. A memory device, comprising:
   a level one volatile (L1V) table configured to store multiple L1V entries in volatile memory;
   a level two volatile (L2V) table configured to store multiple L2V entries in the volatile memory,
      wherein each L2V entry, of the multiple L2V entries, is configured to indicate a correspondence between a logical block address (LBA) and a user data physical address in non-volatile memory,
      wherein each L1V entry, of the multiple L1V entries, is configured to indicate a correspondence between an LBA region, associated with multiple LBAs, and a level two non-volatile (L2N) physical address at which corresponding L2N entries are stored;
   log memory configured to store an indication of each LBA region that is associated with an updated L2V entry that has not yet been copied to the non-volatile memory;
   journal memory configured to store journal entries corresponding to LBA regions associated with updated L2V entries; and
   a controller configured to:
      copy one or more sets of L2V entries, corresponding to LBA regions indicated in the log memory, to an L2N table stored in the non-volatile memory based on an L2 transfer condition;
      update one or more L2N physical addresses, associated with the LBA regions indicated in the log memory, in the L1V table based on the L2 transfer condition; and
      update a level one non-volatile (L1N) table stored in the non-volatile memory based on an L1 transfer condition.

2. The memory device of claim 1, wherein the L2 transfer condition includes a quantity of LBA regions, indicated in the log memory, satisfying a log memory threshold.

3. The memory device of claim 1, wherein the L1 transfer condition includes a quantity of journal entries, stored in the journal memory, satisfying a journal memory threshold.

4. The memory device of claim 1, wherein updating the L1N table comprises:
   identifying a set of L1V entries corresponding to a single LBA section that includes multiple LBA regions;
   identifying a corresponding set of L2N physical addresses indicated in the set of L1V entries; and
   copying the set of L2N physical addresses to a corresponding set of L1N entries of the L1N table.

5. The memory device of claim 4, wherein the controller is further configured to identify the single LBA section based on a most recent LBA section for which one or more L2N physical addresses were copied to the L1N table.

6. The memory device of claim 1, further comprising a level zero volatile (L0V) table configured to store multiple L0V entries in the volatile memory,
   wherein each L0V entry, of the multiple L0V entries, is configured to indicate a correspondence between an LBA section, associated with multiple LBA regions, and an L1N physical address at which L1N entries corresponding to the LBA section are stored in the non-volatile memory.

7. The memory device of claim 1, wherein the controller is further configured to store one or more journal entries in the journal memory based on copying the one or more sets of L2V entries to the L2N table,
   wherein the one or more journal entries correspond to LBA regions that correspond to the one or more sets of L2V entries copied to the L2N table.

8. The memory device of claim 1, wherein the controller is further configured to:
   detect power up of the memory device;
   store the L1V table in the volatile memory based on detecting the power up and based on copying the L1N table; and
   update the L1V table based on one or more journal pages, of the journal memory, stored in the non-volatile memory.

9. The memory device of claim 1, further comprising:
   the L1N table,
      wherein the L1N table is configured to store multiple L1N entries in the non-volatile memory,
      wherein the L1N table is updated based on copying a set of L2N physical addresses indicated in a set of L1V entries included in the L1V table; and
   the L2N table,
      wherein the L2N table is configured to store multiple L2N entries in the non-volatile memory,
      wherein the L2N table is updated based on copying the one or more sets of L2V entries to the L2N table.

10. A memory device, comprising:
   one or more components configured to:
      store, in volatile memory, a level one volatile (L1V) table that includes multiple L1V entries;
      store, in the volatile memory, a level two volatile (L2V) table that includes multiple L2V entries,
         wherein each L2V entry, of the multiple L2V entries, indicates a correspondence between a logical block address (LBA) and a user data physical address in non-volatile memory,
         wherein each L1V entry, of the multiple L1V entries, indicates a correspondence between an LBA region, associated with a set of LBAs, and a level two non-volatile (L2N) physical address at which a set of L2N entries, corresponding to the set of LBAs, is stored;
      detect a memory operation that updates an L2V entry of the multiple L2V entries;
      store, in a changelog, an indication of an updated LBA region associated with the updated L2V entry based on detecting the memory operation that updates the L2V entry;
      detect that an L2 transfer condition is satisfied; and
      copy one or more sets of L2V entries, corresponding to one or more updated LBA regions indicated in the changelog, to the non-volatile memory based on detecting that the L2 transfer condition is satisfied.

11. The memory device of claim 10, wherein the one or more components are further configured to store one or more journal entries, corresponding to the one or more updated LBA regions, in a journal based on copying the one or more sets of L2V entries to the non-volatile memory,
   wherein the one or more updated LBA regions correspond to the one or more sets of L2V entries copied to the non-volatile memory.

12. The memory device of claim 11, wherein the journal includes a volatile journal stored in the volatile memory and one or more non-volatile journal pages stored in the non-volatile memory; and
   wherein the one or more components are further configured to:
      copy the volatile journal to the non-volatile memory as a non-volatile journal page based on a quantity of journal entries included in the volatile journal satisfying a threshold.

13. The memory device of claim 11, wherein the one or more components are further configured to:
   store, in the volatile memory, a level zero volatile (L0V) table that includes multiple L0V entries,
      wherein each L0V entry, of the multiple L0V entries, indicates a correspondence between an LBA section, associated with a set of LBA regions, and a level one non-volatile (L1N) physical address at which a set of L1N entries, corresponding to the set of LBA regions, is stored;
   detect that an L1 transfer condition, associated with the journal, is satisfied;
   identify a next set of L1V entries, corresponding to a next LBA section, based on detecting that the L1 transfer condition is satisfied and based on a most recent LBA section that was updated; and
   copy L2N physical addresses, indicated in the next set of L1V entries, to the non-volatile memory.

14. The memory device of claim 13, wherein the one or more components are further configured to:
   detect a power down event for the memory device;
   copy every set of L2V entries that corresponds to any updated LBA region indicated in the changelog to the non-volatile memory based on detecting the power down event;
   store an updated journal entry, for each updated LBA region, in a volatile memory portion of the journal based on copying every set of L2V entries that corresponds to any updated LBA region indicated in the changelog to the non-volatile memory;
   copy the volatile memory portion of the journal to the non-volatile memory based on detecting the power down event;
   store an updated L0V entry, for each updated LBA section, in the L0V table based on storing the updated journal entry for each updated LBA region; and
   copy the L0V table to the non-volatile memory based on detecting the power down event.

15. The memory device of claim 13, wherein the one or more components, to detect that the L1 transfer condition is satisfied, are configured to detect that a quantity of journal entries stored in the journal satisfies a threshold.

16. The memory device of claim 10, wherein the one or more components, to detect that the L2 transfer condition is satisfied, are configured to detect that a quantity of LBA regions, indicated in the changelog, satisfies a threshold.

17. The memory device of claim 10, wherein the one or more components are further configured to update one or more sets of level one non-volatile (L1N) entries, corresponding to the one or more sets of L2V entries, in the non-volatile memory based on detecting that the L2 transfer condition is satisfied.

18. The memory device of claim 17, wherein the one or more components are further configured to:
   detect a power down event for the memory device;
   copy every set of L2V entries that corresponds to any updated LBA region indicated in the changelog to the non-volatile memory based on detecting the power down event; and
   update every set of L1N entries that corresponds to an updated LBA section, that includes multiple LBA regions, in the non-volatile memory based on detecting the power down event.

19. A method, comprising:
   detecting, by a memory device, a memory operation that updates a level two volatile (L2V) entry stored in an L2V table that includes multiple L2V entries, wherein each L2V entry, of the multiple L2V entries, indicates a mapping between a respective logical block address (LBA) and a respective user data physical address in non-volatile memory of the memory device, wherein the memory operation causes a mapping between an LBA indicated in the L2V entry and a user data physical address indicated in the L2V entry to become invalid, and wherein the L2V table is stored in volatile memory of the memory device;

storing, by the memory device and in a volatile memory log, an indication of an LBA region that includes the LBA based on detecting the memory operation that updates the L2V entry;

detecting, by the memory device, that an L2 transfer condition, associated with the volatile memory log, is satisfied; and copying, by the memory device and from the volatile memory to the non-volatile memory, every L2V entry that indicates an LBA included in the LBA region based on detecting that the L2 transfer condition is satisfied.

20. The method of claim 19, wherein detecting that the L2 transfer condition is satisfied comprises detecting that a quantity of LBA regions, indicated in the volatile memory log, satisfies a threshold; and wherein copying every L2V entry that indicates an LBA included in the LBA region comprises copying every L2V entry that indicates an LBA included in any LBA region indicated in the volatile memory log.

21. The method of claim 19, further comprising:

updating the L2V entry based on detecting the memory operation;

storing a journal entry in a volatile memory journal based on updating the L2V entry, wherein the journal entry indicates the LBA region, that includes the LBA indicated in the L2V entry, and an updated level two non-volatile (L2N) physical address at which corresponding L2N entries, associated with the LBA region, are stored in the non-volatile memory;

detecting that an L1 transfer condition, associated with a journal that includes the volatile memory journal, is satisfied;

identifying one or more level one volatile (L1V) entries, stored in an L1V table, based on detecting that the L1 transfer condition is satisfied; and copying one or more L2N physical addresses indicated in the one or more L1V entries to the non-volatile memory.

22. The method of claim 21, wherein detecting that the L1 transfer condition is satisfied comprises detecting that a quantity of journal entries, stored in the journal, satisfies a threshold.

23. The method of claim 19, further comprising updating a level one non-volatile (L1N) entry set, corresponding to the L2V entry, in the non-volatile memory based on detecting that the L2 transfer condition is satisfied, wherein the L1N entry set includes an L1N entry that indicates the LBA region and that indicates a new level two non-volatile (L2N) physical address at which corresponding L2N entries, associated with the LBA region, are stored in the non-volatile memory.

24. The method of claim 19, further comprising:

updating a level one non-volatile (L1N) entry, corresponding to the L2V entry, in the non-volatile memory; and updating a level zero volatile (L0V) entry, stored in an L0V table that includes multiple L0V entries, based on updating the L1N entry, wherein each L0V entry, of the multiple L0V entries, indicates a mapping between a respective LBA section, associated with a respective group of LBA regions, and a respective L1N physical address where a respective group of L1N entries, corresponding to the respective group of LBA regions, is stored in the non-volatile memory, wherein the L0V entry is associated with an LBA section that includes the LBA region indicated in the L1N entry, and wherein the L0V table is stored in the volatile memory.

25. The method of claim 19, wherein the memory operation is a first memory operation and the L2V entry is a first L2V entry; and further comprising:

detecting a second memory operation that updates a second L2V entry of the multiple L2V entries;

determining that the second L2V entry is associated with the LBA region indicated in the volatile memory log; and refraining from storing another indication of the LBA region in the volatile memory log based on determining that the second L2V entry is associated with the LBA region indicated in the volatile memory log.

* * * * *

UNITED STATES PATENT AND TRADEMARK OFFICE
CERTIFICATE OF CORRECTION

PATENT NO. : 12,105,621 B2
APPLICATION NO. : 17/930117
DATED : October 1, 2024
INVENTOR(S) : Steven R. Narum et al.

Page 1 of 1

It is certified that error appears in the above-identified patent and that said Letters Patent is hereby corrected as shown below:

In the Claims

Claim 24:
Column 34, Line 18, change "updating a level one non-volatile (LIN) entry, correspond-" to
-- updating a level one non-volatile (L1N) entry, correspond- --

Signed and Sealed this
Sixteenth Day of September, 2025

Coke Morgan Stewart
*Acting Director of the United States Patent and Trademark Office*